US012143789B1

(12) United States Patent
Russell et al.

(10) Patent No.: US 12,143,789 B1
(45) Date of Patent: Nov. 12, 2024

(54) USER LOCALIZATION

(71) Applicant: Amazon Technologies, Inc., Seattle, WA (US)

(72) Inventors: Spencer Russell, Quincy, MA (US); Carlos Renato Nakagawa, San Jose, CA (US); Mohamed Mansour, Cupertino, CA (US)

( * ) Notice: Subject to any disclaimer, the term of this patent is extended or adjusted under 35 U.S.C. 154(b) by 317 days.

(21) Appl. No.: 17/825,613

(22) Filed: May 26, 2022

(51) Int. Cl.
*H04S 7/00* (2006.01)
*H04R 5/04* (2006.01)
*H04S 5/00* (2006.01)

(52) U.S. Cl.
CPC ................ *H04R 5/04* (2013.01); *H04S 5/00* (2013.01); *H04S 7/303* (2013.01); *H04R 2205/024* (2013.01); *H04R 2420/01* (2013.01); *H04S 2400/01* (2013.01)

(58) Field of Classification Search
CPC ....................................................... H04S 7/303
See application file for complete search history.

(56) References Cited

U.S. PATENT DOCUMENTS

2012/0117502 A1* 5/2012 Nguyen ................ G06F 3/0482
715/769

* cited by examiner

*Primary Examiner* — Ping Lee
(74) *Attorney, Agent, or Firm* — Pierce Atwood LLP

(57) ABSTRACT

A system configured to improve user localization used to determine a listening position and/or user orientation for a device map. Multiple devices may generate audio data representing user speech and the system may use the audio data to determine a first spatial likelihood function (SLF) based on angle measurements, determine a second SLF based on timing information, and determine a location of the user based on a combination of the two SLFs. The SLFs represent the environment using a grid comprising a plurality of grid cells, and each grid cell has a value indicating a likelihood that the grid cell corresponds to the location of the user. An individual device may generate a portion of the angle measurements based on multi-channel audio data generated using multiple microphones of the device, while the system may generate the timing information based on single-channel audio data received from each of the multiple devices.

20 Claims, 27 Drawing Sheets

Combined SLF Data
1010

Farfield Example 1400

USER LOCALIZATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

DETAILED DESCRIPTION

Figure 1:
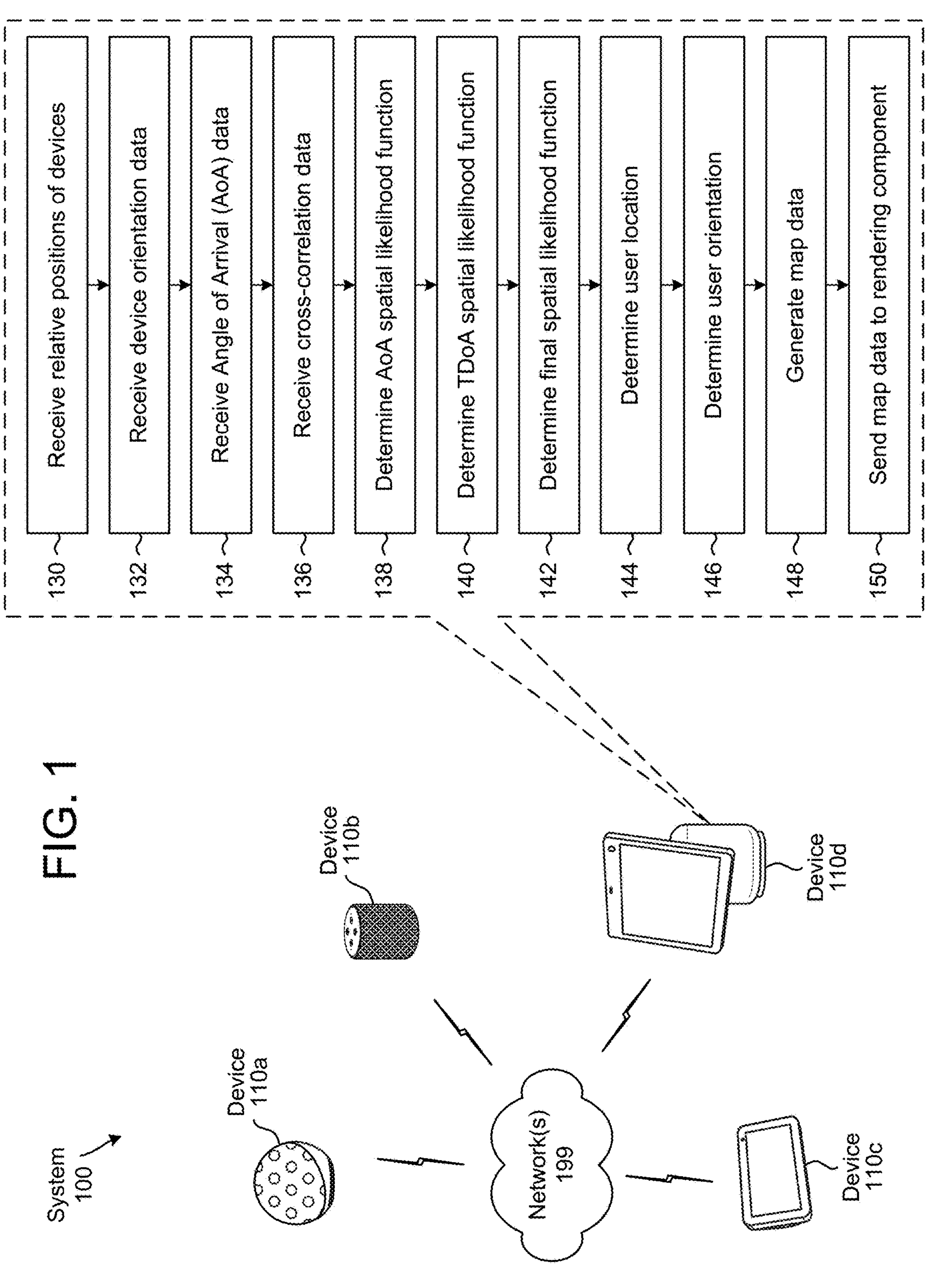
FIG. 1 is a conceptual diagram illustrating a system configured to perform user localization as part of multi-device localization and mapping according to embodiments of the present disclosure.

Electronic devices may be used to capture input audio and process input audio data. The input audio data may be used for voice commands and/or sent to a remote device as part of a communication session. In addition, the electronic devices may be used to process output audio data and generate output audio. The output audio may correspond to the communication session or may be associated with media content, such as audio corresponding to music or movies played in a home theater. Multiple devices may be grouped together in order to generate output audio using a combination of the multiple devices.

To optimize audio quality generated by multiple devices for a listening position of a user, devices, systems and methods are disclosed that perform user localization to determine the listening position and use the listening position to generate map data representing a device map. In some examples, the map data may include a listening position and/or television associated with the home theater group, such that the map data is centered on the listening position with the television along a vertical axis. The map data may be used to generate renderer coefficient values for each of the devices, enabling each individual device to generate playback audio that takes into account the location of the device and characteristics of the device (e.g., frequency response, etc.).

To improve user localization in an environment, the system may determine a location of the user and/or a user orientation using a combination of (i) timing information indicating temporal differences between multiple devices and (ii) angle information determined by individual microphone arrays of the multiple devices. For example, each of the multiple devices may generate audio data capturing an audible sound generated by a sound source (e.g., user, television, and/or the like). Using multi-channel audio data generated by an individual microphone array, the system may compare when the audible sound is captured by individual microphones to determine the angle information. The angle information may indicate a direction of the sound source relative to the microphone array and may be determined using Angle of Arrival (AoA) processing, although the disclosure is not limited thereto. Using audio data generated by each of the multiple devices, the system may compare when the audible sound is captured by individual devices to determine the timing information. The timing information may indicate a direction of the sound source relative to the individual device and may be determined using Time Difference of Arrival (TDoA) processing, although the disclosure is not limited thereto.

Using the timing information and/or the angle information, the system may generate a spatial likelihood function that represents the environment using a grid comprising a plurality of grid cells. For example, the spatial likelihood function may associate each grid cell with a spatial likelihood value indicating a likelihood that the grid cell corresponds to a location of the sound source. By combining a first spatial likelihood function generated using the timing information with a second spatial likelihood function generated using the angle information, the system may generate a total spatial likelihood function and may associate a maximum value in the total spatial likelihood function with the location of the user or sound source.

FIG. 1 is a conceptual diagram illustrating a system configured to perform user localization as part of multi-device localization and mapping according to embodiments of the present disclosure. As illustrated in FIG. 1, a system 100 may include multiple devices 110*a*/110*b*/110*c*/110*d* connected across one or more networks 199. In some examples, the devices 110 (local to a user) may also be connected to a remote system 120 across the one or more networks 199, although the disclosure is not limited thereto.

The device 110 may be an electronic device configured to capture and/or receive audio data. For example, the device 110 may include a microphone array configured to generate input audio data, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the device 110 may be configured to receive output audio data and generate output audio using one or more loudspeakers of the device 110. For example, the device 110 may generate output audio corresponding to media content, such as music, a movie, and/or the like.

As illustrated in FIG. 1, the system 100 may include four separate devices 110*a*-110*d*, which may be included in a flexible home theater group, although the disclosure is not limited thereto and any number of devices may be included in the flexible home theater group without departing from the disclosure. For example, a user may group the four devices as part of the flexible home theater group and the system 100 may select one of the four devices 110*a*-110*d* as a primary device that is configured to synchronize output audio between the four devices 110*a*-110*d*. In the example illustrated in FIG. 1, the fourth device 110*d* is the primary device and the first device 110*a*, the second device 110*b*, and the third device 110*c* are secondary devices, although the disclosure is not limited thereto.

In some examples, the fourth device 110*d* may receive a home theater configuration. For example, the user may use a smartphone or other devices and may input the home theater configuration using a user interface. However, the disclosure is not limited thereto, and the system 100 may receive the home theater configuration without departing from the disclosure. In response to the home theater configuration, the fourth device 110*d* may generate calibration data indicating a sequence for generating playback audio, may send the calibration data to each device in the home theater group, and may cause the devices to perform the calibration sequence. For example, the calibration data may indicate that the first device 110*a* may generate a first audible sound during a first time range, the second device 110*b* may generate a second audible sound during a second time range, the third device 110*c* may generate a third audible sound during a third time range, and that the fourth device 110*d* may generate a fourth audible sound during a fourth time range. In some examples there are gaps between the audible sounds, such that the calibration data may be include values of zero (e.g., padded with zeroes between audible sounds), but the disclosure is not limited thereto and the calibration data may not include gaps without departing from the disclosure.

During the calibration sequence, a single device 110 may generate an audible sound and the remaining devices may capture the audible sound in order to determine a relative direction and/or distance. For example, when the first device 110*a* generates the first audible sound, the second device 110*b* may capture the first audible sound by generating first audio data including a first representation of the first audible sound. Thus, the second device 110*b* may perform localization (e.g., sound source localization (SSL) processing and/or the like) using the first audio data and determine a first position of the first device 110*a* relative to the second device 110*b*. Similarly, the third device 110*c* may generate second audio data including a second representation of the first audible sound. Thus, the third device 110*c* may perform localization using the second audio data and may determine a second position of the first device 110*a* relative to the third device 110*c*. Each of the devices 110 may perform these steps to generate audio data and/or determine a relative position of the first device 110*a* relative to the other devices 110, as described in greater detail below with regard to FIGS. 5-6.

The fourth device 110*d* may receive measurement data from the devices 110 in the home theater group. For example, the fourth device 110*d* may receive first measurement data from the second device 110*b*, second measurement data from the third device 110*c*, and third measurement data from the first device 110*a*, although the disclosure is not limited thereto. In some examples, the measurement data may include angle information (e.g., angle of arrival) representing a relative direction from one device to another, along with timing information that the system 100 may use to determine distance values representing relative distances between the devices.

The fourth device 110*d* may determine relative positions of the devices 110 using the distance values. For example, the fourth device 110*d* may determine an optimal arrangement of the devices 110 in the home theater group, such as by using multi-dimensional scaling, determining a least-squares solution, and/or the like. While the relative positions remain fixed based on the distance values between the devices 110, the location of the relative positions may vary. Thus, the fourth device 110*d* may perform additional processing to determine exact locations of the devices 110.

In some examples, the fourth device 110*d* may determine device orientation data. For example, the fourth device 110*d* may use the relative positions of the devices 110 and the angle information included in the measurement data to determine an orientation of each device. To illustrate an example, the fourth device 110*d* may identify a first angle value represented in the measurement data, which indicates a direction of the third device 110*c* relative to an orientation of the second device 110*b* (e.g., relative angle of arrival). The fourth device 110*d* may then use the relative positions to determine a second angle value that corresponds to the actual direction of the third device 110*c* relative to the second device 110*b* in the global coordinate system (e.g., absolute angle of arrival). Using the first angle value and the second angle value, the fourth device 110*d* may determine the orientation of the second device 110*b*, which indicates a rotation of the second device 110*b* relative to the global coordinate system. For example, the combination of the orientation of the second device 110*b* and the first angle value (e.g., relative angle of arrival) is equal to the second angle value (e.g., absolute angle of arrival). Thus, once the fourth device 110*d* determines the device orientation data, the fourth device 110*d* may convert each of the relative angle of arrivals included in the measurement data to absolute angle of arrivals that correspond to the actual directions between the devices 110 in the global coordinate system.

As described in greater detail below, the system 100 may determine a location of the user and/or a user orientation using a combination of (i) timing information indicating temporal differences between the devices 110*a*-110*d* and (ii) angle information determined by individual microphone arrays of the devices 110*a*-110*d*. For example, each of the devices 110*a*-110*d* may generate audio data capturing an audible sound generated by a sound source (e.g., user, television, and/or the like). Using multi-channel audio data generated by an individual microphone array, the system 100 may compare when the audible sound is captured by individual microphones to determine the angle information. The angle information may indicate a direction of the sound source relative to the microphone array and may be determined using Angle of Arrival (AoA) processing, although the disclosure is not limited thereto. Using audio data generated by each of the devices 110*a*-110*d*, the system 100 may compare when the audible sound is captured by individual devices to determine the timing information. The timing information may indicate a direction of the sound source relative to the individual device and may be determined using Time Difference of Arrival (TDoA) processing, although the disclosure is not limited thereto.

Using the timing information and/or the angle information, the system 100 may generate a spatial likelihood function that represents the environment using a grid comprising a plurality of grid cells. For example, the spatial likelihood function may associate each grid cell with a spatial likelihood value indicating a likelihood that the grid cell corresponds to a location of the sound source. By combining a first spatial likelihood function generated using the timing information with a second spatial likelihood function generated using the angle information, the system 100 may generate a total spatial likelihood function and may associate a maximum value in the total spatial likelihood function with the location of the user or sound source.

As illustrated in FIG. 1, the fourth device 110*d* may receive (130) the relative positions of devices and may receive (132) device orientation data, as described in greater detail above. For example, the fourth device 110*d* may receive relative positions of the devices 110 along with an orientation of each device, enabling the fourth device 110*d* to use the devices 110 to perform user localization.

The fourth device 110*d* may receive (134) Angle of Arrival (AoA) data. In some examples, each of the devices 110*a*-110*c* may generate a portion of the AoA data and may send their respective portions of the AoA data to the fourth device 110*d*. However, the disclosure is not limited thereto, and in other examples each of the devices 110*a*-110*c* may send multi-channel audio data captured by a corresponding microphone array to the fourth device 110*d* and the fourth device 110*d* may generate the AoA data using the multi-channel audio data without departing from the disclosure.

The fourth device 110*d* may receive (136) cross-correlation data associated with pairwise combinations of the devices 110*a*-110*d*. For example, the system 100 may generate first cross-correlation data using first audio data generated by the first device 110*a* and second audio data generated by the second device 110*b*, second cross-correlation data using the first audio data and third audio data generated by the third device 110*c*, and third cross-correlation data using the first audio data and fourth audio data generated by the fourth device 110*d*. Similarly, the system 100 may generate fourth cross-correlation data using the second audio data and the third audio data, fifth cross-correlation data using the second audio data and the fourth audio data, and sixth cross-correlation data using the third audio data and the fourth audio data. Thus, the cross-correlation data corresponds to pairwise combinations of the devices 110*a*-110*d*.

The fourth device 110*d* may determine (138) an AoA spatial likelihood function using the AoA data. For example, the fourth device 110*d* may use the angle information associated with each device 110*a*-110*d* to determine individual spatial likelihood functions and may determine the AoA spatial likelihood function by summing or otherwise combining the individual spatial likelihood functions, although the disclosure is not limited thereto.

As described in greater detail below, a spatial likelihood function represents an environment (e.g., search space) using a grid that comprises a plurality of grid cells or grid points (e.g., plurality of segments) having a uniform size. Thus, the system 100 may divide the search space into the plurality of grid cells and determine a spatial likelihood value for each grid cell. For example, the system 100 may determine a first spatial likelihood value associated with a first grid cell, and the first spatial likelihood value may indicate a first likelihood that the first grid cell corresponds to the user (e.g., the user location and/or listening position is located within the first grid cell). Similarly, the system 100 may determine a second spatial likelihood value associated with a second grid cell, and the second spatial likelihood value may indicate a second likelihood that the second grid cell corresponds to the user (e.g., the user location and/or listening position is located within the second grid cell). Thus, the spatial likelihood function indicates the relative likelihood that the user is located within each grid cell, enabling the fourth device 110*d* to determine a user location by identifying a maximum likelihood value represented in the total spatial likelihood function.

The audio data may represent user speech or other utterances generated by the user, as captured by each of the devices 110*a*-110*d*. Thus, each cross-correlation data includes a peak representing the user speech, which corresponds to a Time Difference of Arrival (TDoA) between the two devices associated with the cross-correlation data. The fourth device 110*d* may determine (140) a TDoA spatial likelihood function using the cross-correlation data. For example, the fourth device 110*d* may use the cross-correlation data to determine pairwise spatial likelihood functions and may determine the TDoA spatial likelihood function by summing or otherwise combining the pairwise spatial likelihood functions, although the disclosure is not limited thereto.

After determining the AoA spatial likelihood function and the TDoA spatial likelihood function, the fourth device 110*d* may determine (142) a final spatial likelihood function. For example, the fourth device 110*d* may determine the final spatial likelihood function by combining the AoA spatial likelihood function and the TDoA spatial likelihood function. The fourth device 110*d* may combine these spatial likelihood functions using a weighted sum operation, a log-likelihood operation, and/or the like without departing from the disclosure.

The fourth device 110*d* may determine (144) a user location using the final spatial likelihood function. For example, the fourth device 110*d* may determine the user location by identifying a maximum likelihood value represented in the total spatial likelihood function, although the disclosure is not limited thereto.

The fourth device 110*d* may determine (146) a user orientation, which indicates a look direction from the listening position to the television. In some examples, the fourth device 110*d* may repeat steps 134-142 for audio data representing an audible sound generated by the television. For example, the fourth device 110*d* may use the audio data from each of the devices 110*a*-110*d* to determine a second AoA spatial likelihood function, a second TDoA spatial likelihood function, and a second final spatial likelihood function corresponding to the television.

In some examples, the fourth device 110*d* may determine a maximum likelihood value represented in the second total spatial likelihood function, may associate the maximum likelihood value with a location of the television, and may determine the user orientation based on a look direction between the listening position and the estimated location of the television. However, the disclosure is not limited thereto, and in other examples the fourth device 110*d* may determine the user orientation without determining the location of the television. For example, the second total spatial likelihood function may include a plurality of likelihood values that are similar to the maximum likelihood value, indicating that the location of the television could correspond to a plurality of grid cells. Thus, the system 100 may determine a rough area associated with the television, but not the actual location of the television. As the user orientation indicates a direction of the television relative to the listening position, the fourth device 110*d* may determine the user orientation based on the plurality of grid cells without departing from the disclosure. However, the disclosure is not limited thereto, and in some examples the fourth device 110*d* may determine the user orientation without determining the second total spatial likelihood function without departing from the disclosure.

Determining the user location and/or user orientation enables the system 100 to provide context for the device map, such as centering the device map on a listening position associated with the user and/or orienting the device map based on a look direction from the listening position to the television. This context is beneficial as it enables the system 100 to render output audio properly for the home theater group, with a sound stage of the output audio aligned with the television (e.g., directional sounds generated in the appropriate direction) and volume balanced between the devices (e.g., a volume of the output audio generated by a particular device is determined based on a distance from the device to the listening position).

The fourth device 110*d* may generate (148) map data. For example, the fourth device 110*d* may generate map data indicating locations of each of the devices 110 included in the home theater group. In some examples, the fourth device 110*d* may use the user location (e.g., listening position) and user orientation to determine a center point and an orientation of the device map. For example, the fourth device 110*d* may generate the map data with the center point corresponding to the listening position, such that coordinate values of each of the locations in the map data indicate a position relative to the listening position. Additionally or alternatively, the fourth device 110*d* may generate the map data with the television along a vertical axis from the listening position, such that a look direction from the listening position to the television extends vertically along the vertical axis.

After generating the map data, the fourth device 110*d* may send (150) the map data to a rendering component to generate rendering coefficient. For example, the rendering component may process the map data and determine rendering coefficient values for each of the devices 110*a*-110*d* included in the home theater group.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

The device 110 may include multiple microphones configured to capture sound and pass the resulting audio signal created by the sound to a downstream component. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. A particular direction may be associated with azimuth angles divided into bins (e.g., μθ-45 degrees, 46-90 degrees, and so forth). To isolate audio from a particular direction, the device 110 may apply a variety of audio filters to the output of the microphones where certain audio is boosted while other audio is dampened, to create isolated audio corresponding to a particular direction, which may be referred to as a beam. While in some examples the number of beams may correspond to the number of microphones, the disclosure is not limited thereto and the number of beams may be independent of the number of microphones. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, although the disclosure is not limited thereto.

Figure 2:
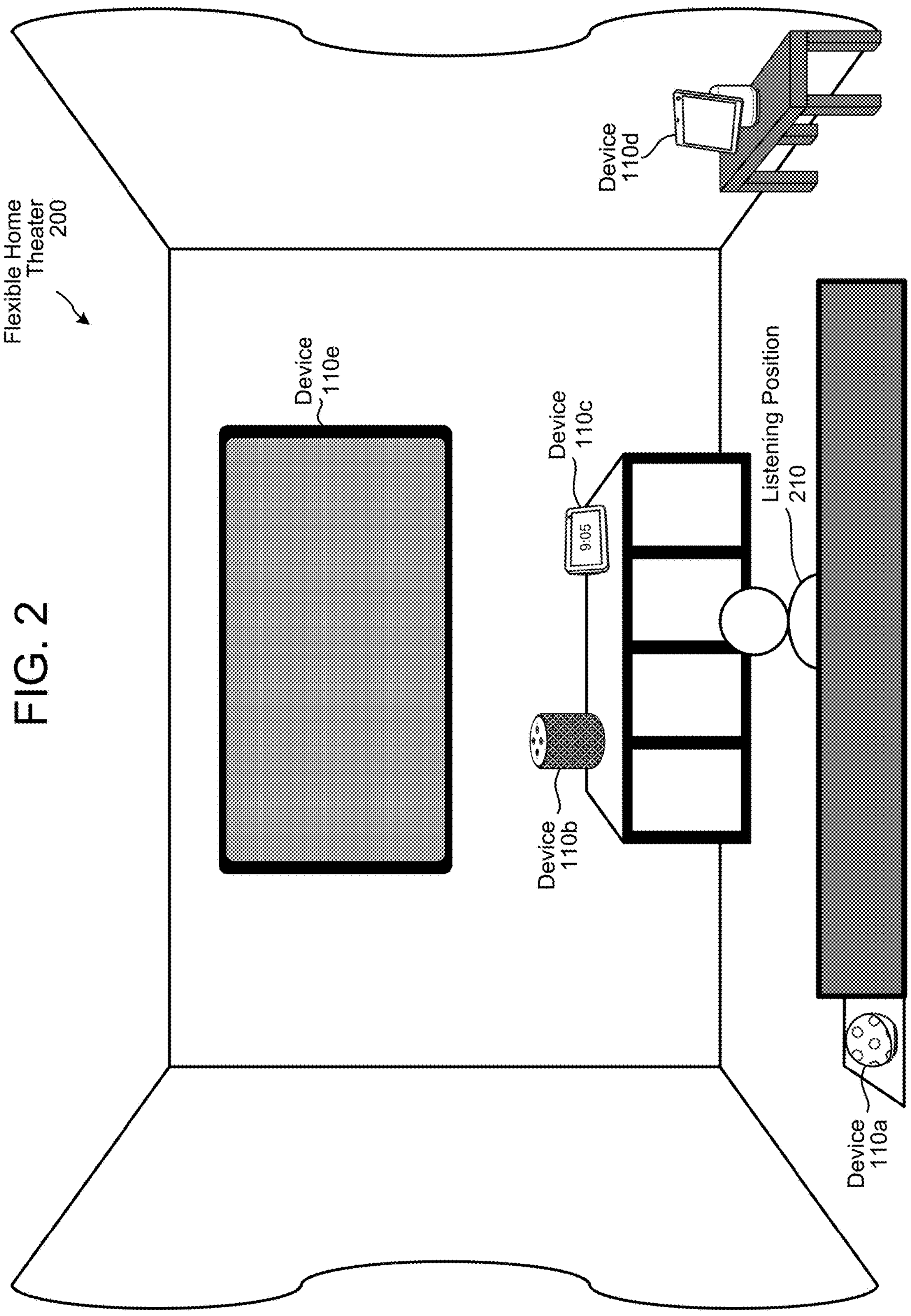
FIG. 2 illustrates an example of a flexible home theater according to embodiments of the present disclosure.

FIG. 2 illustrates an example of a flexible home theater according to embodiments of the present disclosure. As illustrated in FIG. 2, a flexible home theater 200 may comprise a variety of devices 110 without departing from the disclosure. For example, FIG. 2 illustrates an example home theater that includes a first device 110*a* (e.g., speech-enabled device) at a first location to the left of a listening position 210 of the user, a second device 110*b* (e.g., speech-enabled device) at a second location in front of and to the left of the listening position 210, a third device 110*c* (e.g., speech-enabled device with a screen) at a third location in front of and to the right of the listening position 210, a fourth device 110*d* (e.g., speech-enabled device with a screen) at a fourth location to the right of the listening position 210, and a fifth device 110*e* (e.g., television or headless device associated with the television) at a fifth location directly in front of the listening position 210. Thus, the second device 110*b* is below the television to the left, while the third device 110*c* is below the television to the right. However, the disclosure is not limited thereto and the flexible home theater 200 may include additional devices 110 without departing from the disclosure. Additionally or alternatively, the flexible home theater 200 may include fewer devices 110 and/or the locations of the devices 110 may vary without departing from the disclosure.

Despite the flexible home theater 200 including multiple different types of devices 110 in an asymmetrical configuration relative to the listening position 210 of the user, the system 100 may generate playback audio optimized for the listening position 210. For example, the system 100 may generate map data indicating the locations of the devices 110, the type of devices 110, and/or other context (e.g., number of loudspeakers, frequency response of the drivers, etc.), and may send the map data to a rendering component. The rendering component may generate individual renderer coefficient values for each of the devices 110, enabling each individual device 110 to generate playback audio that takes into account the location of the device 110 and characteristics of the device 110 (e.g., frequency response, etc.).

To illustrate a first example, the second device 110*b* may act as a center channel in the flexible home theater 200 despite being slightly off-center below the television. For example, second renderer coefficient values associated with the second device 110*b* may adjust the playback audio generated by the second device 110*b* to shift the sound stage to the left from the perspective of the listening position 210 (e.g., centered under the television). To illustrate a second example, the fourth device 110*d* may act as a right channel and the first device 110*a* may act as a left channel in the flexible home theater 200, despite being different distances from the listening position 210. For example, fourth renderer coefficient values associated with the fourth device 110*d* and first renderer coefficient values associated with the first device 110*a* may adjust the playback audio generated by the fourth device 110*d* and the first device 110*a* such that the two channels are balanced from the perspective of the listening position 210.

Figure 3A:
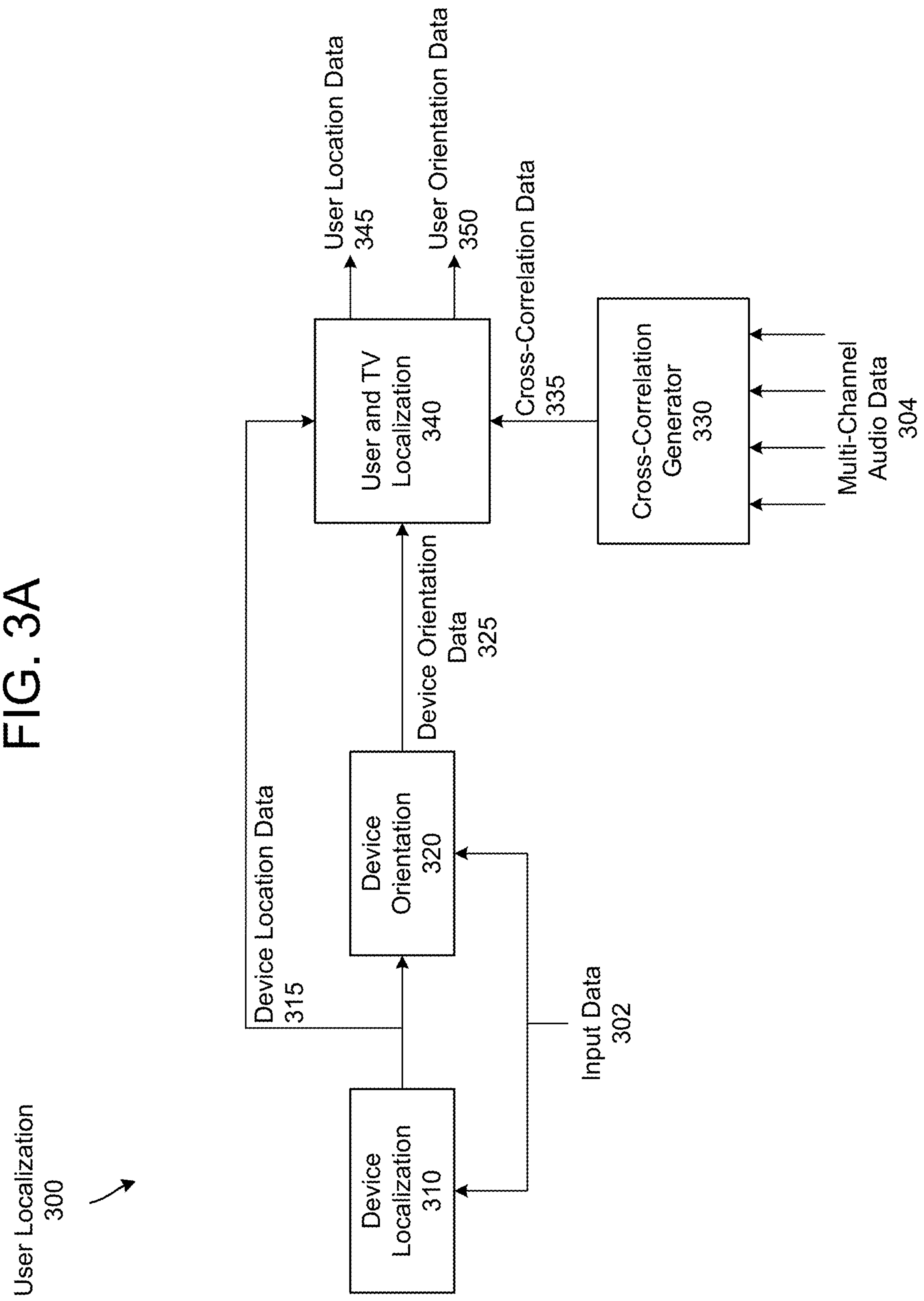
FIGS. 3A-3C illustrate example component diagrams for performing user localization according to embodiments of the present disclosure.
Figure 3B:
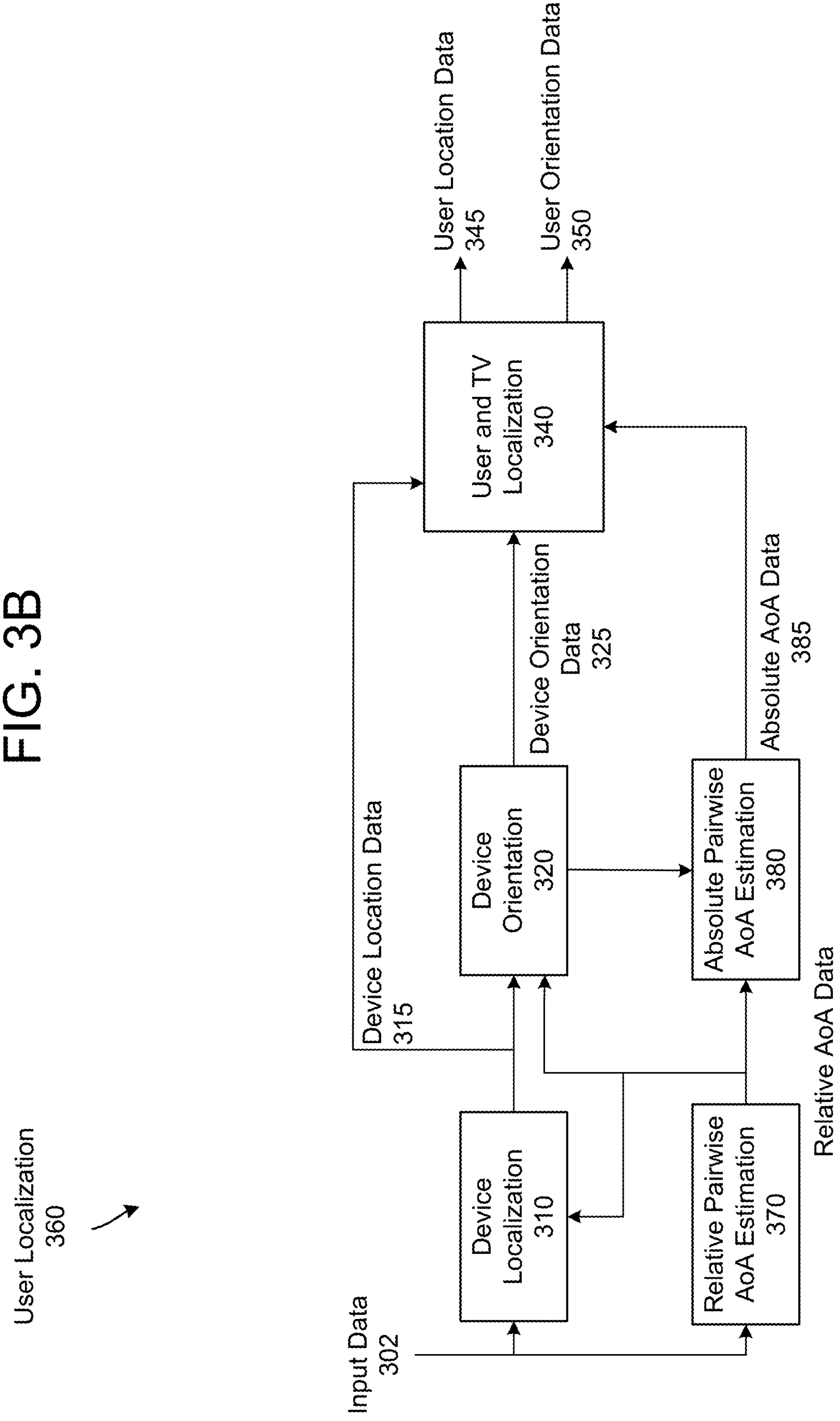
Figure 3C:
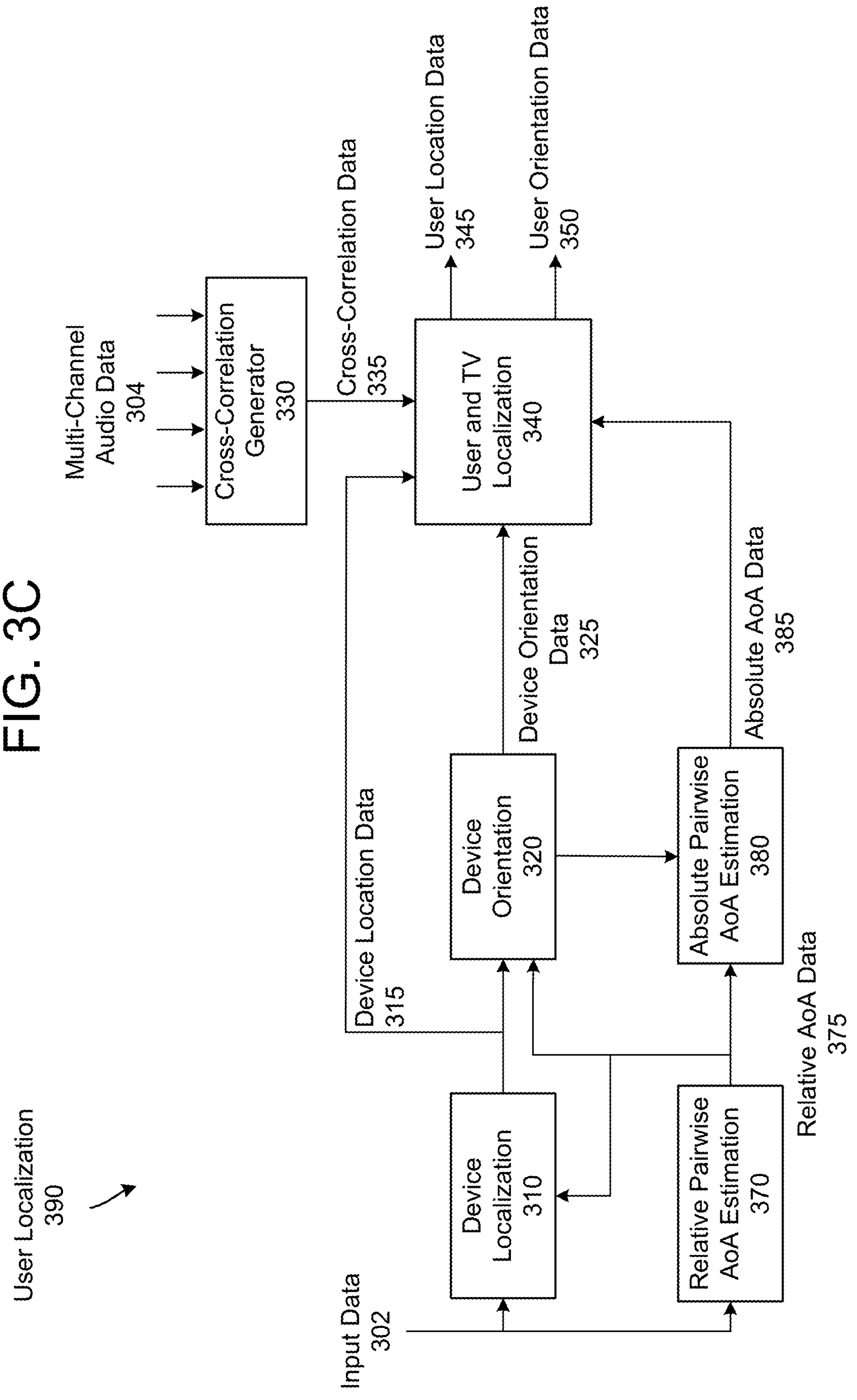

FIGS. 3A-3C illustrate example component diagrams for performing user localization according to embodiments of the present disclosure. As described above, the system 100 may perform device localization and user localization to generate a device map. To perform device localization, the system 100 may cause each device 110 included in the flexible home theater group to generate measurement data during a calibration sequence, as will be described in greater detail below with regard to FIGS. 5-6. For example, the first device 110*a* may generate first measurement data, the second device 110*b* may generate second measurement data, a third device 110*c* may generate third measurement data, and the fourth device 110*d* may generate fourth measurement data. While the example illustrated in FIG. 2 only includes the flexible home theater including four devices 110*a*-110*d*, the disclosure is not limited thereto and the flexible home theater may have any number of devices 110 without departing from the disclosure.

The first device 110*a* may generate the first measurement data by generating first audio data capturing one or more audible sounds and performing sound source localization processing to determine direction(s) associated with the audible sound(s) represented in the first audio data. For example, if the second device 110*b* is generating first playback audio during a first time range, the first device 110*a* may capture a representation of the first playback audio and perform sound source localization processing to determine that the second device 110*b* is in a first direction relative to the first device 110*a*, although the disclosure is not limited thereto. Similarly, the second device 110*b* may generate the second measurement data by generating second audio data capturing one or more audible sounds and performing sound source localization processing to determine direction(s) associated with the audible sound(s) represented in the second audio data. For example, if the third device 110*c* is generating second playback audio during a second time range, the second device 110*b* may capture a representation of the second playback audio and perform sound source localization processing to determine that the third device 110*c* is in a second direction relative to the second device 110*b*, although the disclosure is not limited thereto.

In some examples, the measurement data may include information associated with each of the other devices 110 in the flexible home theater. To illustrate an example, the measurement data may include angle information and timing information generated by the devices 110*a*-110*d*. For example, the angle information (e.g., angle of arrival value, variance associated with the angle of arrival, and/or the like) may indicate a relative direction from a first device to a second device, while the timing information may enable the system 100 to estimate a propagation delay and/or calculate distance values (e.g., range information), such as a distance from the first device to the second device. However, the disclosure is not limited thereto, and the measurement data may include additional information without departing from the disclosure.

As illustrated in FIG. 3A, a device localization component 310 may receive input data 302, which may include the measurement data, the audio data, the sound source localization data, and/or the like without departing from the disclosure. The device localization component 310 may determine relative positions of the devices included in the flexible home theater group and may generate device location data 315 indicating the relative positions of the devices. For example, the system 100 may use the distance values to perform a process, such as multi-dimensional scaling, to determine an optimal arrangement between the devices. In some examples, the system 100 may determine the optimal arrangement by solving a least-squares problem using the set of measured distance values between the devices (e.g., range information).

A device orientation component 320 may receive the input data 302 and the device location data 315 and may determine device orientation data 325 indicating device orientations. For example, the system 100 may use the relative positions of the devices 110 and the angle information included in the measurement data to determine an orientation of each device. To illustrate an example, the system 100 may identify a first angle value represented in the measurement data, which indicates a direction of the third device 110$c$ relative to an orientation of the second device 110$b$ (e.g., relative angle of arrival). The system 100 may then use the relative positions to determine a second angle value that corresponds to the actual direction of the third device 110$c$ relative to the second device 110$b$ in the global coordinate system (e.g., absolute angle of arrival). Using the first angle value and the second angle value, the first device 110$a$ may determine the orientation of the second device 110$b$, which indicates a rotation of the second device 110$b$ relative to the global coordinate system. For example, the combination of the orientation of the second device 110$b$ and the first angle value (e.g., relative angle of arrival) is equal to the second angle value (e.g., absolute angle of arrival). Thus, once the system 100 determines the device orientation data 325, the system 100 may convert each of the relative angle of arrivals included in the measurement data to absolute angle of arrivals that correspond to the actual directions between the devices 110 in the global coordinate system.

The system 100 may perform user localization 300 using the device location data 315, the device orientation data 325, and cross-correlation data 335, as will be described in greater detail below with regard to FIGS. 8-9.

As illustrated in FIG. 3A, a cross-correlation generator component 330 may receive multi-channel audio data 304 and may generate the cross-correlation data 335. For example, the multi-channel audio data 304 may include at least one channel of audio data from each of the devices 110 that generated audio data during the calibration sequence. For example, the multi-channel audio data 304 may include a first channel associated with the first device 110$a$, a second channel associated with the second device 110$b$, a third channel associated with the third device 110$c$, and a fourth channel associated with the fourth device 110$d$, although the disclosure is not limited thereto.

As will be described in greater detail below with regard to FIG. 8, the cross-correlation generator component 330 may generate pairwise cross-correlation data for each of the pairwise combinations of devices 110. For example, the cross-correlation generator component 330 may generate first cross-correlation data using the first channel and the second channel, second cross-correlation data using the first channel and the third channel, third cross-correlation data using the first channel and the fourth channel, fourth cross-correlation data using the second channel and the third channel, fifth cross-correlation data using the second channel and the fourth channel, and sixth cross-correlation data using the third channel and the fourth channel.

A user and TV localization component 340 may use the device location data 315 and the device orientation data 325 to determine a location and orientation for each of the devices 110 that generated audio data during the calibration sequence (e.g., devices 110$a$-110$d$). For example, as generating the audio data enables the system 100 to determine distance information, only the devices 110 that generated the audio data and are thus associated with distance information are included in the device location data. Using the location and orientation information for each of the devices 110$a$-110$d$, the system 100 may perform device localization to determine a location of any additional devices 110 included in the flexible home theater system. For example, the system 100 may perform device localization to determine a location and/or direction of a fifth device 110$e$ (e.g., television), as will be described in greater detail below. However, the disclosure is not limited thereto, and in some examples the flexible home theater may include more than one device 110 that did not generate audio data during the calibration sequence.

To perform device localization for the fifth device 110$e$, the system 100 may instruct the fifth device 110$e$ to generate an audible sound and may capture representations of the audible sound using the devices 110$a$-110$d$. For example, the fifth device 110$e$ may be included in the calibration sequence, despite not generating audio data, such that the multi-channel audio data 304 generated by the devices 110$a$-110$d$ may include representations of the audible sound output by the fifth device 110$e$ during a fifth time range. To perform device localization for the fifth device 110$e$, the cross-correlation generator component 330 may generate a first portion of the cross-correlation data 335 corresponding to the representations of the audible sound and the user and TV localization component 340 may generate a first spatial likelihood function using the first portion of the cross-correlation data, as will be described in greater detail below with regard to FIG. 9.

Similarly, the user and TV localization component 340 may also perform user localization to determine a location of the user (e.g., listening position 210). For example, the system 100 may instruct the user to speak from the listening position 210 and the multi-channel audio data 304 may include representations of the speech during a sixth time range. To perform user localization, the cross-correlation generator component 330 may generate a second portion of the cross-correlation data 335 corresponding to the representations of the speech and the user and TV localization component 340 may generate a second spatial likelihood function using the second portion of the cross-correlation data, as will be described in greater detail below with regard to FIG. 9.

Using the second spatial likelihood function, the user and TV localization component 340 may determine the location of the user and generate user location data 345 indicating the user location. Using the first spatial likelihood function, the user and TV localization component 340 may determine a direction of the fifth device 110$e$ relative to the location of the user and may generate user orientation data 350 indicating the direction (e.g., user orientation). Thus, even though the user and TV localization component 340 may be unable to estimate a location of the fifth device 110$e$, the user and TV localization component 340 may still determine the user orientation based on a relative direction of the fifth device 110$e$.

While FIG. 3A illustrates an example of performing user localization 300 and determining a spatial likelihood function using temporal differences between the devices (e.g., Time Difference of Arrival (TDoA) processing), the disclosure is not limited thereto. In some examples, the system 100 may determine a spatial likelihood function using angle information determined by individual microphone arrays (e.g., Angle of Arrival (AoA) processing) without departing from the disclosure. For example, each device 110 may include a microphone array that is configured to generate multi-channel audio data. Based on when an audible sound is captured by each individual microphone, the system 100 may determine angle information (e.g., an AoA value) corresponding to a location of a sound source that generated the audible sound. For example, the angle information may indicate a direction of the sound source relative to the device 110. Using the angle information associated with each of the devices 110, the system 100 may generate the spatial likelihood function and determine the location of the user, as described in greater detail below with regard to FIG. 15.

As used herein, the angle information may be represented as a relative value (e.g., relative AoA value), which indicates angle information relative to a device orientation, and/or an absolute value (e.g., absolute AoA value), which indicates angle information using a fixed frame of reference such as a global coordinate system. To illustrate an example of a relative value, the first device 110*a* may generate relative AoA data (e.g., relative AoA value) indicating that a second device 110*b* is in a first direction relative to a fixed point associated with the first device 110*a*. In some examples, the fixed point may correspond to a front of the first device 110*a*, such that the first direction varies depending on which direction the first device 110*a* is facing. As used herein, the direction that the first device 110*a* is facing may be referred to as an orientation of the device 110, which may be represented as a device orientation indicating this direction relative to the global coordinate system. For example, the device orientation may indicate a rotation of the first device 110*a* relative to the global coordinate system and may vary based on how the first device 110*a* is positioned.

While the relative AoA data may enable the first device 110*a* to determine a relative position of the second device 110*b*, other devices 110 may be unable to determine the relative position of the second device 110*b* without knowing the device orientation associated with the relative AoA data. If the system 100 knows the device orientation, the system 100 may use the device orientation and the relative AoA data to determine absolute AoA data (e.g., absolute AoA value), which indicates that the second device 110*b* is in a second direction relative to a location of the first device 110*a* within the grid. As the absolute AoA data indicates the second direction relative to the global coordinate system, other devices 110 may use the absolute AoA data without regard to a current device orientation of the first device 110*a*. Conversely, if the system 100 knows the relative AoA data and the absolute AoA data, the system 100 may determine the device orientation associated with the first device 110*a*. For example, the system 100 may determine the device orientation based on a difference between the absolute AoA value and the relative AoA value without departing from the disclosure.

FIG. 3B illustrates an example of performing user localization 360 and determining a spatial likelihood function using the angle information. As illustrated in FIG. 3B, a relative pairwise AoA estimation component 370 may receive the input data 302 and may generate relative AoA data 375. To illustrate an example, the relative AoA data 375 may include a first plurality of relative AoA values that indicate a direction of each of the devices 110 included in the flexible home theater relative to the first device 110*a*. For example, the relative AoA data 375 may include a first relative AoA value indicating a first direction of the second device 110*b* relative to a first device orientation of the first device 110*a*, a second relative AoA value indicating a second direction of the third device 110*c* relative to the first device orientation, and so on. As described above, the system 100 may determine the first plurality of relative AoA values using first multi-channel audio data generated by a first microphone array associated with the first device 110*a*.

The disclosure is not limited thereto, however, and the system 100 may generate the relative AoA data 375 using each of the microphone arrays, such that the relative AoA data 375 includes angle information generated for each individual device 110 associated with a microphone array. Thus, the relative AoA data 375 may also include a second plurality of relative AoA values that indicate a direction of each of the devices 110 included in the flexible home theater relative to the second device 110*b*. For example, the relative AoA data 375 may include a third relative AoA value indicating a third direction of the first device 110*a* relative to a second device orientation of the second device 110*b*, a fourth relative AoA value indicating a fourth direction of the third device 110*c* relative to the second device orientation, and so on. The system 100 may determine the second plurality of relative AoA values using second multi-channel audio data generated by a second microphone array associated with the second device 110*b*.

The relative pairwise AoA estimation component 370 may output the relative AoA data 375 to the device localization component 310, the device orientation component 320, and the absolute pairwise AoA estimation component 380. As described above, the device orientation component 320 may use the relative AoA data 375 and the device location data 315 to generate the device orientation data 325. For example, the device orientation component 320 may use the device location data 315 to determine a first absolute AoA value indicating an actual direction of the second device 110*b* relative to the first device 110*a* in the global coordinate system (e.g., absolute angle of arrival), and may determine the first device orientation based on the first relative AoA value and the first absolute AoA value. For example, the combination of the orientation of the first device 110*a* and the first relative AoA value (e.g., relative angle of arrival) may be equal to the first absolute angle value (e.g., absolute angle of arrival).

The device orientation component 320 may output the device orientation data 325 to the user and TV localization component 340 and the absolute pairwise AoA estimation component 380. Thus, the absolute pairwise AoA estimation component 380 may receive the relative AoA data 375 and the device orientation data 325 and may generate absolute AoA data 385. For example, the absolute pairwise AoA estimation component 380 may convert each of the relative angle of arrival values included in the relative AoA data 375 to absolute angle of arrival values that correspond to the actual directions between the devices 110 in the global coordinate system.

The absolute pairwise AoA estimation component 380 may output the absolute AoA data 385 to the user and TV localization component 340. As illustrated in FIG. 3B, during user localization 360 the user and TV localization component 340 may use the device location data 315, the device orientation data 325, and the absolute AoA data 385 to generate the user location data 345 and/or the user orientation data 350, as described in greater detail below with regard to FIGS. 15 and 17A-17B.

As described above, FIG. 3A illustrates a first example of performing user localization 300 and determining a first spatial likelihood function using temporal differences between the devices (e.g., TDoA processing), while FIG. 3B illustrates a second example of performing user localization 360 and determining a second spatial likelihood function using angle information determined by individual microphone arrays (e.g., AoA processing). However, the disclosure is not limited thereto, and in some examples the system 100 may perform user localization 390 using a combination of TDoA processing and AoA processing. For example, the system 100 may generate the first spatial likelihood function and the second spatial likelihood function, as described above, and may use this data to generate a third spatial likelihood function, as described in greater detail below with regard to FIG. 18. FIG. 3C illustrates an example of performing the user localization 390 by including the cross-correlation generator component 330, the relative pairwise AoA estimation component 370, and the absolute pairwise AoA estimation component 380. For example, the user and TV localization component 340 may receive the device location data 315, the device orientation data 325, the cross-correlation data 335, and the absolute AoA data 385 and may generate the user location data 345 and/or the user orientation data 350.

The system 100 may determine a perspective with which to generate the device map. For example, the system 100 may determine the listening position 210 of the user and center the device map on the listening position 210, such that locations of the devices 110 within the device map are relative to the listening position 210 (e.g., listening position 210 is at an origin). In some examples, such as when a television is associated with the home theater group, the system 100 may determine a location of the television and generate the device map with the television along a vertical axis. Thus, the device map may represent locations of the devices 110 relative to a look direction from the listening position 210 to the television, although the location of the television may not be included in the device map without departing from the disclosure.

In some examples, the system 100 may prompt the user to speak from the listening position 210, such as by saying a wakeword or particular utterance, and the devices 110 may detect the wakeword or other speech and generate the user localization measurement data indicating a direction of the speech relative to each device. As the system 100 previously determined the device orientation data indicating an orientation for each device 110, in some examples the system 100 may identify the orientation of a selected device and determine the direction to the user based on the user localization measurement data generated by the selected device 110. Thus, the system 100 may perform triangulation using two or more devices 110 in the home theater group to determine a location associated with the speech.

In some examples, the system 100 may instruct the television to generate two audible sounds at a specific time, such as a first audible sound using a left channel and a second audible sound using a right channel of the television. Each of the devices 110 in the flexible home theater group may detect these audible sounds and determine angle information associated with the television. For example, a selected device may generate first angle information associated with the first audible sound (e.g., left channel) and generate second angle information associated with the second audible sound (e.g., right channel). Knowing the device orientation data for the selected device, the system 100 may determine the direction of the television relative to the selected device based on the first angle information, the second angle information, and the device orientation of the selected device. Repeating this process for multiple devices in the flexible home theater group, in some examples the system 100 may estimate the location of the television (e.g., by performing triangulation or the like), although the disclosure is not limited thereto.

In some examples, the system 100 may track the left channel and the right channel separately to determine two different locations, such that the system 100 determines the location of the television by averaging the two locations. For example, the system 100 may use two sets of angle information for each device to determine a first location associated with the left channel and a second location associated with the right channel, then determine the location of the television as being between the first location and the second location. However, the disclosure is not limited thereto, and in other examples the system 100 may separately identify the left channel and the right channel but then combine this information to determine a single location associated with the television without departing from the disclosure. For example, the system 100 may determine a mean value (e.g., average) of the first angle information and the second angle information and use this mean value to determine the direction of the television relative to the selected device without departing from the disclosure.

In some examples, the system 100 may include the television in the calibration data such that the measurement data already includes the angle information associated with the television. However, the disclosure is not limited thereto, and in other examples the system 100 may perform television localization as a discrete step in which the television generates the audible sounds separately from the other devices in the home theater group without departing from the disclosure.

The device map data may include location(s) associated with each of the devices 110, a location of a listening position 210, a direction of a television relative to the listening position 210 and/or a location of the television, and/or the like without departing from the disclosure. In some examples, the device map data may include additional information, such as device descriptors or other information corresponding to the devices 110 included in the device map.

Determining the listening position 210 and/or the location of the television enables the system 100 to provide context for the device map, such as centering the device map on the listening position 210 and/or orienting the device map based on a look direction from the listening position 210 to the television. This context is beneficial as it enables the system 100 to render output audio properly for the home theater group, with a sound stage of the output audio aligned with the television (e.g., directional sounds generated in the appropriate direction) and volume balanced between the devices (e.g., a volume of the output audio generated by a particular device is determined based on a distance from the device to the listening position).

Thus, the device map may represent the listening position 210 at a first location in the device map (e.g., at an origin, which is the intersection between the horizontal axis and the vertical axis in a two-dimensional plane, although the disclosure is not limited thereto) and represent each of the devices 110 at a corresponding location in the device map, with the device map oriented relative to the location of the television such that the location of the television is along a vertical axis from the listening position 210, although the disclosure is not limited thereto.

In addition, the system 100 may process the device map data, the listening position data, and/or device description data to generate flexible renderer coefficient values. For example, the system 100 may generate first renderer coefficient data (e.g., first renderer coefficient values) for the first device 110*a*, second renderer coefficient data (e.g., second renderer coefficient values) for the second device 110*b*, third renderer coefficient data (e.g., third renderer coefficient values) for the third device 110*c*, and/or fourth renderer coefficient data (e.g., fourth renderer coefficient values) for the fourth device 110*d*, although the disclosure is not limited thereto. The renderer coefficient values enable the system 100 to render output audio properly for the home theater group, with a sound stage of the output audio aligned with the television.

Figure 4:
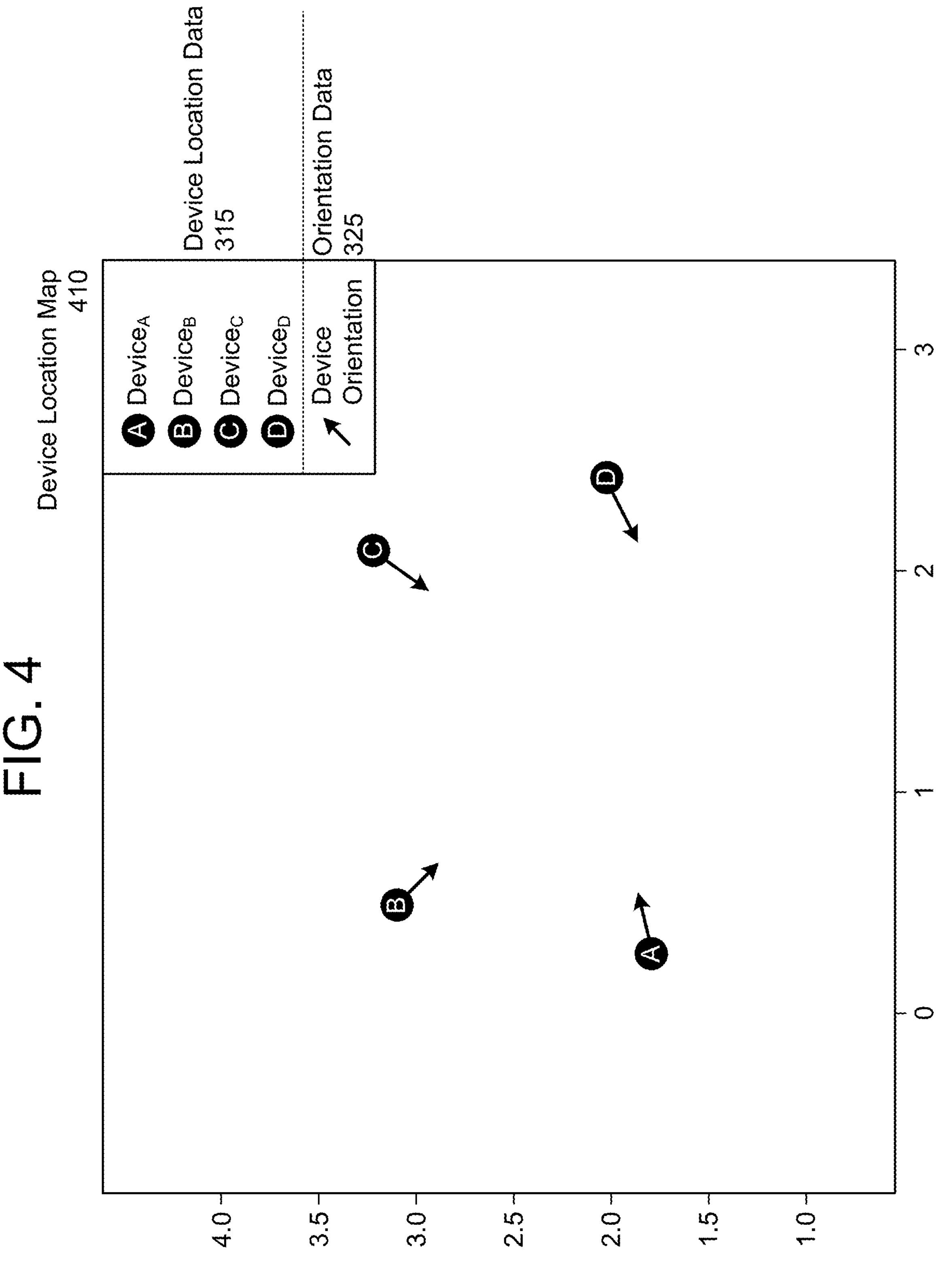
FIG. 4 illustrates an example of a device location map according to embodiments of the present disclosure.

FIG. 4 illustrates an example of a device location map according to embodiments of the present disclosure. As illustrated in FIG. 4, a device location map 410 may represent a location and an orientations for each of the devices 110 included in the flexible home theater. For example, the user and TV localization component 340 may receive the device location data 315 and the device orientation data 325 described above with regard to FIGS. 3A-3C. In the example illustrated in FIG. 4, the device location map 410 indicates a first location and first orientation associated with the first device 110a (e.g., Device A), a second location and second orientation associated with the second device 110b (e.g., Device B), a third location and third orientation associated with the third device 110c (e.g., Device C), and a fourth location and fourth orientation associated with the fourth device 110d (e.g., Device D).

Using the device location data 315 and the device orientation data 325, the user and TV localization component 340 may perform user localization to determine a location of the user (e.g., listening position 210) and a user orientation (e.g., direction from the listening position 210 to the fifth device 110e). In some examples, the user and TV localization component 340 may determine a fifth location associated with the television (e.g., fifth device 110e), but the disclosure is not limited thereto and the user and TV localization component 340 only needs to determine a direction of the television relative to the listening position 210.

While the device location map 410 only illustrates four devices 110a-110d, the disclosure is not limited thereto and the device location map 410 may include any number of devices without departing from the disclosure. Additionally or alternatively, for ease of illustration the device location map 410 represents the devices 110a-110d in a particular orientation that is based on the listening position 210 being at an origin and the television being oriented along a vertical axis. However, the disclosure is not limited thereto and the device locations represented in the device location map 410 may vary without departing from the disclosure. For example, prior to the user and TV localization component 340 performing user localization, the device location map 410 may represent the devices 110a-110d using relative positions that may be rotated or flipped relative to a final device map.

Figure 5:
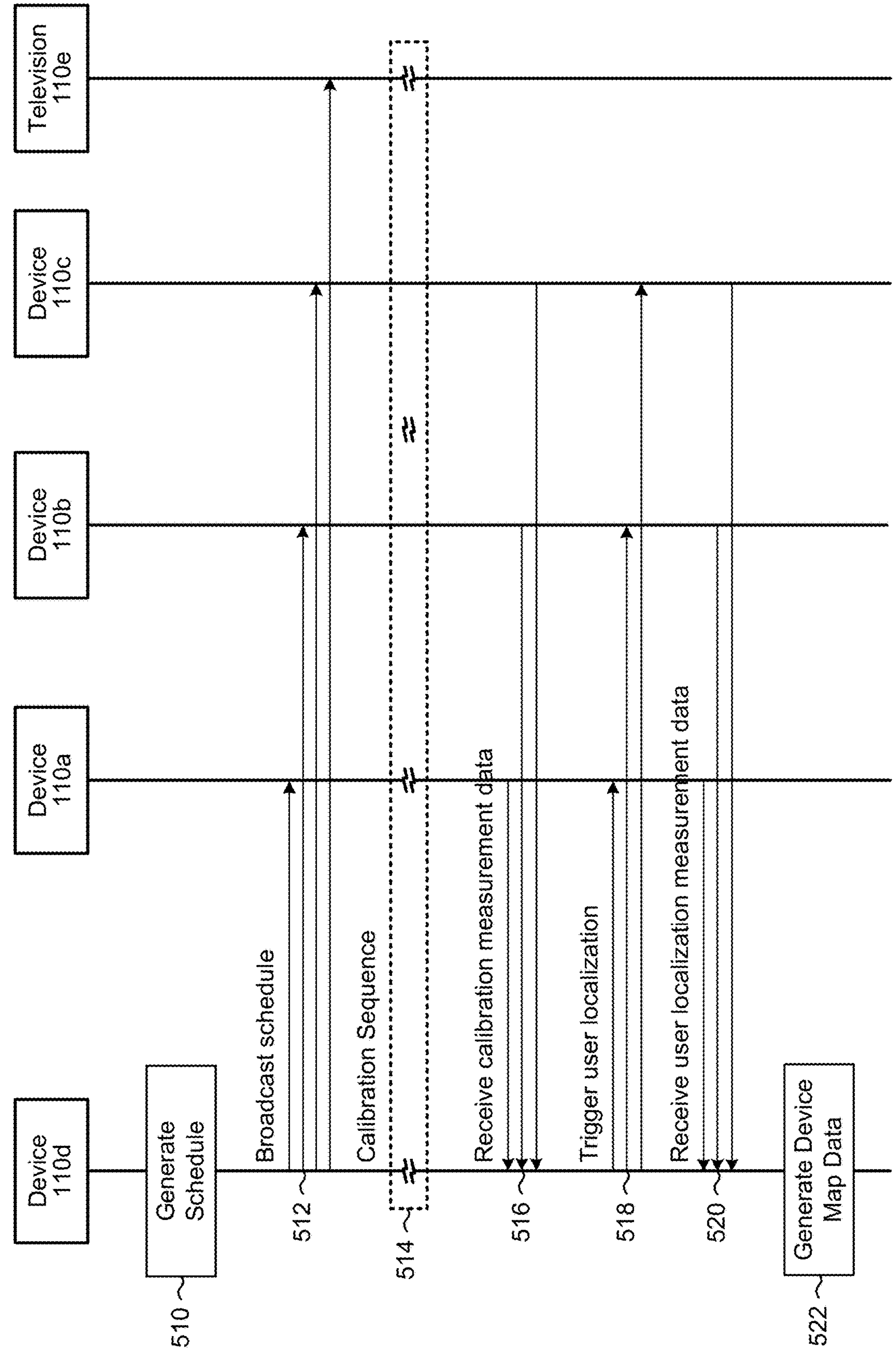
FIG. 5 is a communication diagram illustrating an example of performing multi-device localization according to embodiments of the present disclosure.

FIG. 5 is a communication diagram illustrating an example of performing multi-device localization according to embodiments of the present disclosure. As illustrated in FIG. 5, the fourth device 110d may be a primary device and may generate (510) a schedule for performing a calibration sequence. For example, the fourth device 110d may generate calibration data to indicate to the secondary devices (e.g., devices 110a-110c and 110e) which individual device is expected to generate an audible sound at a particular time range. For example, the calibration data may indicate that the first device 110a will generate a first audible sound during a first time range, the second device 110b will generate a second audible sound during a second time range, the third device 110c will generate a third audible sound during a third time range, and so on.

The fourth device 110d may broadcast (512) the schedule to each of the secondary devices (e.g., 110a-110c and 110e) and may start (514) the calibration sequence. For example, the fourth device 110d may send the calibration data to the first device 110a, to the second device 110b, to the third device 110c, to the fifth device 110e, and/or to any additional secondary devices included in the flexible home theater group. Each of the devices 110a-110e may start the calibration sequence based on the calibration data received from the fourth device 110d. For example, during the first time range the first device 110a may generate the first audible sound while some of the devices 110a-110d generate audio data including representations of the first audible sound. Similarly, during the second time range the second device 110b may generate the second audible sound while the devices 110a-110d generate audio data including representations of the second audible sound. In some examples, some of the devices 110 (e.g., fifth device 110e) may not include a microphone and therefore may not generate audio data during the calibration steps illustrated in FIG. 5 without departing from the disclosure. However, the other devices 110a-110d may still determine a relative position of the fifth device 110e based on a fifth audible sound generated by the fifth device 110e.

The fourth device 110d may receive (516) calibration measurement data from devices 110a-110c. For example, the devices 110a-110c may process the audio data and generate the calibration measurement data by comparing a delay between when an audible sound was scheduled to be generated and when the audible sound was captured by the respective device 110. To illustrate an example, the first device 110a may perform sound source localization to determine an angle of arrival (AOA) associated with the second device 110b, although the disclosure is not limited thereto. Additionally or alternatively, the first device 110a may determine timing information associated with the second device 110b, which may be used to determine a distance between the first device 110a and the second device 110b, although the disclosure is not limited thereto. While not illustrated in FIG. 5, in some examples the fourth device 110d may generate calibration measurement data as well, if the fourth device 110d includes a microphone and is configured to generate audio data.

The fourth device 110d may trigger (518) user localization and may receive (520) user localization measurement data from each of the devices 110a-110c. For example, the fourth device 110d may send instructions to the devices 110a-110c to perform user localization and the instructions may cause the devices 110a-110c to begin the user localization process. During the user localization process, the devices 110a-110d may be configured to capture audio in order to detect a wakeword or other audible sound generated by the user and generate the user localization measurement data corresponding to the user. For example, the system 100 may instruct the user to speak the wakeword from the user's desired listening position 210 and the user localization measurement data may indicate a relative direction and/or distance from each of the devices 110 to the listening position 210. While not illustrated in FIG. 5, in some examples the fourth device 110d may also generate user localization measurement data if the fourth device 110d includes a microphone and is configured to generate audio data.

After receiving the calibration measurement data and the user localization measurement data, the fourth device 110d may generate (522) device map data representing a device map for the flexible home theater group. For example, the fourth device 110d may process the calibration measurement data in order to generate a final estimate of device locations, interpolating between the calibration measurement data generated by individual devices 110a-110d. Additionally or alternatively, the fourth device 110d may process the user localization measurement data to generate a final estimate of the listening position 210, interpolating between the user localization measurement data generated by individual devices 110a-110d.

If the flexible home theater group does not include a display such as a television, the fourth device 110d may generate the device map based on the listening position 210, but an orientation of the device map may vary. For example, the fourth device 110*d* may set the listening position 210 as a center point and may generate the device map extending in all directions from the listening position 210. However, if the flexible home theater group includes a television, the fourth device 110*d* may set the listening position 210 as a center point and may select the orientation of the device map based on a location of the television. For example, the fourth device 110*d* may determine the location of the television and may generate the device map with the location of the television extending along a vertical axis, although the disclosure is not limited thereto.

To determine the location of the television, in some examples the fourth device 110*d* may generate calibration data instructing the television to generate a first audible noise using a left channel during a first time range and generate a second audible noise using a right channel during a second time range. Thus, each of the devices 110*a*-110*d* may generate calibration measurement data including separate calibration measurements for the left channel and the right channel, such that a first portion of the calibration measurement data corresponds to a first location associated with the left channel and a second portion of the calibration measurement data corresponds to a second location associated with the right channel. This enables the fourth device 110*d* to determine the location of the television based on the first location and the second location, although the disclosure is not limited thereto.

Figure 6:
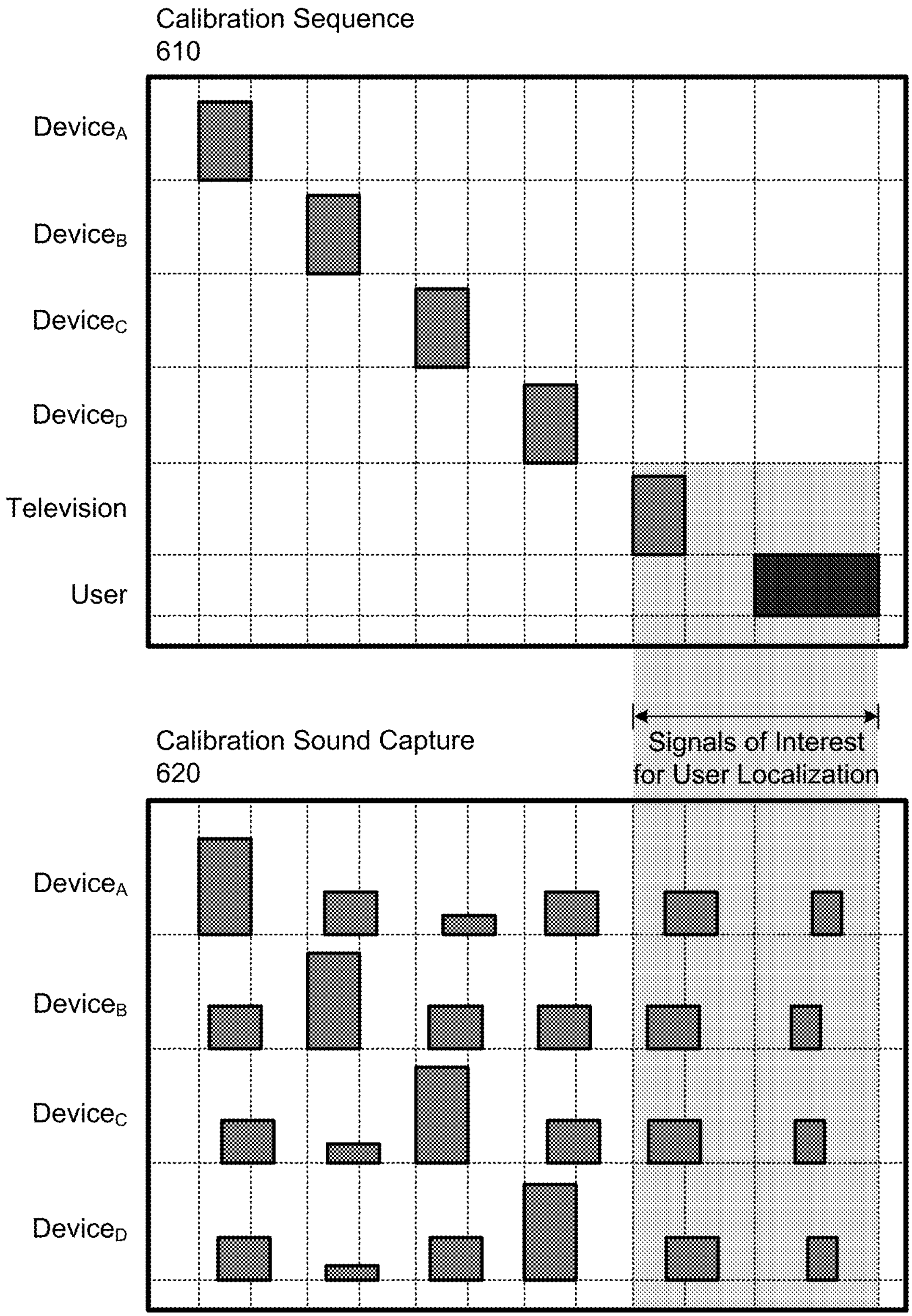
FIG. 6 illustrates examples of calibration sound playback and calibration sound capture according to embodiments of the present disclosure.

FIG. 6 illustrates examples of calibration sound playback and calibration sound capture according to embodiments of the present disclosure. As illustrated in FIG. 6, the calibration data may indicate a calibration sequence illustrated by calibration sequence 610. For example, a first device ($Device_A$) may generate a first audible sound during a first time range, a second device ($Device_B$) may generate a second audible sound during a second time range, a third device ($Device_C$) may generate a third audible sound during a third time range, a fourth device ($Device_D$) may generate a fourth audible sound during a fourth time range, a fifth device (Television) may generate a fifth audible sound during a fifth time range, and user localization may be performed during a sixth time range.

As the exact timing associated with the user speech is unknown, the calibration sequence 610 illustrates the sixth time range as a listening period instead of as a pulse signal. While the calibration sequence 610 illustrates the fifth device (Television) generating the fifth audible sound during the fifth time range, the disclosure is not limited thereto. As described above, in some examples the fifth device may generate distinct audible sounds using a left channel and a right channel without departing from the disclosure. Thus, the fifth device may generate the fifth audible sound during the fifth time range using a left channel, may generate a sixth audible sound during a sixth time range using a right channel, and user localization may be performed during a seventh time range without departing from the disclosure.

The measurement data generated by some of the devices 110 (e.g., devices 110 that include a microphone) is represented in calibration sound capture 620. For example, the calibration sound capture 620 illustrates that while the first device ($Device_A$) captures the first audible sound immediately, the other devices capture the first audible sound after variable delays caused by a relative distance from the first device to the capturing device. To illustrate a first example, the first device ($Device_A$) may generate first audio data that includes a first representation of the first audible sound within the first time range and at a first volume level (e.g., amplitude). However, the second device ($Device_B$) may generate second audio data that includes a second representation of the first audible sound after a first delay and at a second volume level that is lower than the first volume level. Similarly, the third device ($Device_C$) may generate third audio data that includes a third representation of the first audible sound after a second delay and at a third volume level that is lower than the first volume level, and the fourth device ($Device_D$) may generate fourth audio data that includes a fourth representation of the first audible sound after a third delay and at a fourth volume level that is lower than the first volume level.

Similarly, the second audio data may include a first representation of the second audible sound within the second time range and at a first volume level. However, the first audio data may include a second representation of the second audible sound after a first delay and at a second volume level that is lower than the first volume level, the third audio data may include a third representation of the second audible sound after a second delay and at a third volume level that is lower than the first volume level, and the fourth audio data may include a fourth representation of the second audible sound after a third delay and at a fourth volume level that is lower than the first volume level.

As illustrated in FIG. 6, the third audio data may include a first representation of the third audible sound within the third time range and at a first volume level. However, the first audio data may include a second representation of the fourth audible sound after a first delay and at a second volume level that is lower than the first volume level, the second audio data may include a third representation of the fourth audible sound after a second delay and at a third volume level that is lower than the first volume level, and the fourth audio data may include a fourth representation of the fourth audible sound after a third delay and at a fourth volume level that is lower than the first volume level.

The fourth audio data may include a first representation of the fourth audible sound within the fourth time range at a first volume level. However, the first audio data may include a second representation of the second audible sound after a first delay and at a second volume level that is lower than the first volume level, the second audio data may include a third representation of the fourth audible sound after a second delay and at a third volume level that is lower than the first volume level, and the third audio data may include a fourth representation of the fourth audible sound after a third delay and at a fourth volume level that is lower than the first volume level. Based on the different delays and/or amplitudes, the system 100 may determine a relative position of each of the devices within the environment.

As illustrated in FIG. 6, each of the devices may capture representations of the fifth audible sound generated by the fifth device (Television) after variable short delays. In addition, during the sixth time range the devices may capture representations of a sixth audible sound representing user speech after variable short delays. As the fifth device 110*e* (Television) does not generate audio data, the system 100 may be unable to determine precise timing information and/or calculate distances from each of the devices 110*a*-110*d* to the fifth device 110*e*. Similarly, the system 100 may be unable to determine precise timing information and/or calculate distances from each of the devices 110*a*-110*d* to the user. Instead, the fourth device 110*d* may process the measurement data to perform user localization. Thus, FIG. 6 illustrates that the fifth time range and the sixth time range correspond to signals of interest for user localization.

In some examples, the system 100 may estimate a time difference of arrival (TDoA) value between two devices by determining a time difference between when each device captures a particular audible sound. For example, the system 100 may determine a first timestamp associated with the audible sound being captured by the first device 110*a* (e.g., represented in first audio data generated by the first device 110*a*) and a second timestamp associated with the audible sound being captured by the second device 110*b* (e.g., represented in second audio data generated by the second device 110*b*). By determining a difference between the first timestamp and the second timestamp, the system 100 may determine a first TDoA value associated with the first device 110*a* and the second device 110*b*.

However, performing any time-based localization, such as TDoA processing, requires that the audio data from multiple devices 110 be synchronized with each other. In some examples, this synchronization can occur when the devices 110 themselves are synchronized to each other. For example, a first clock signal associated with the first device 110*a* may be synchronized with a second clock signal associated with the second device 110*b*, the first device 110*a* may begin generating first audio data at the same time that the second device 110*b* begins generating second audio data, and/or the like. In other examples, this synchronization can occur based on sounds represented in the audio data itself. For example, the first audio data may be synchronized with the second audio data based on an audible sound represented in both the first audio data and the second audio data. However, synchronizing the first audio data to the second audio data based on a single audible sound removes time differences caused by the different positions of the first device 110*a* and the second device 110*b* relative to the sound source generating the audible sound.

While the devices 110 included in the flexible home theater may not be synchronized with each other, the calibration sequence 610 enables the system 100 to synchronize the audio data between multiple devices 110. For example, as both the first device 110*a* and the second device 110*b* capture a first audible sound generated by the first device 110*a* and a second audible sound generated by the second device 110*b*, the system 100 may determine a reference point by which to synchronize the first audio data to the second audio data without removing the time differences. In some examples, the system 100 may align the first audio data and the second audio data based on a midpoint between the first audible sound and the second audible sound, which enables the system 100 to measure a time-of-flight between the first device 110*a* and the second device 110*b*.

Figure 7:
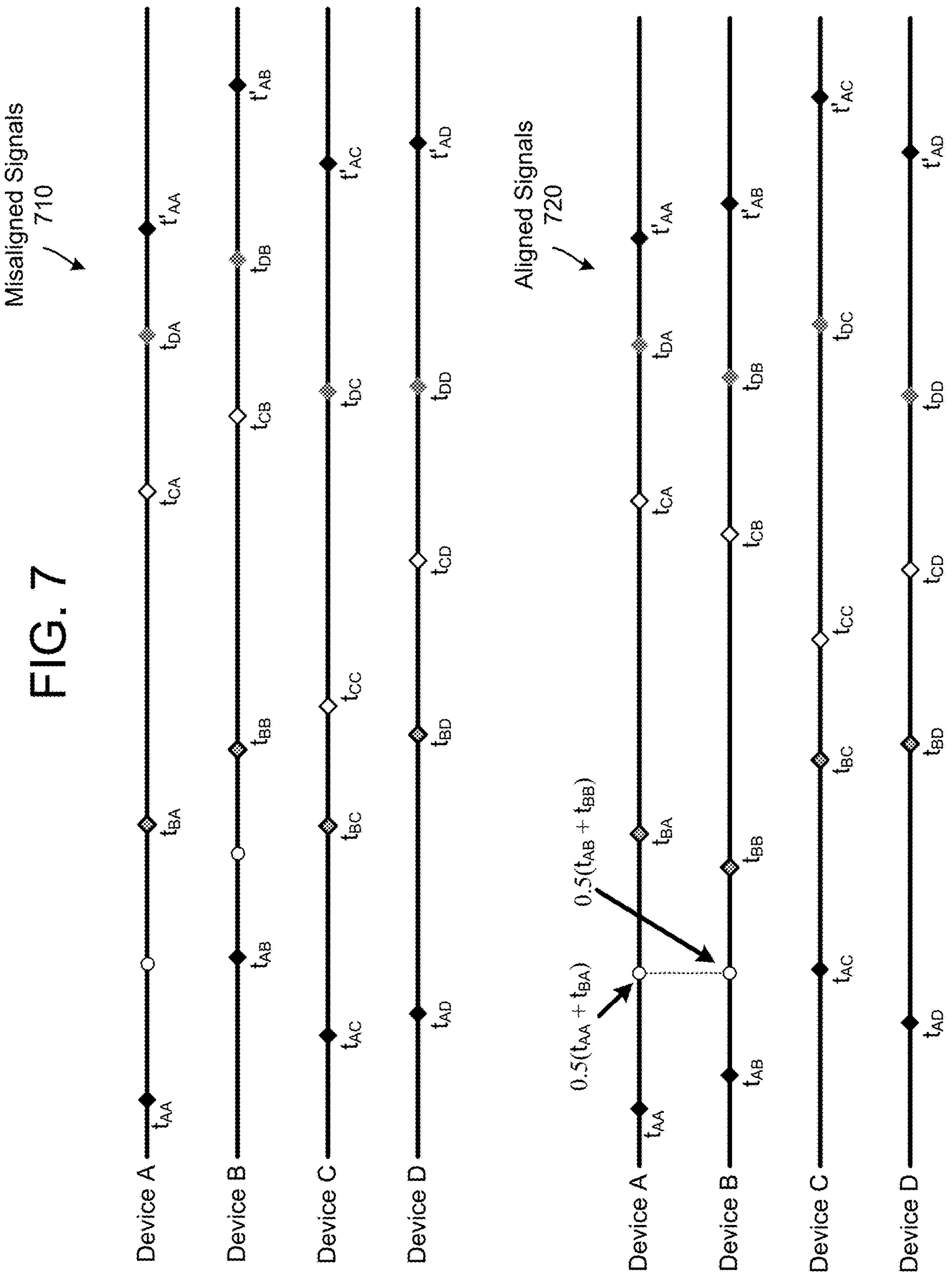
FIG. 7 illustrates an example of aligning audio data based on the calibration sequence according to embodiments of the present disclosure.

FIG. 7 illustrates an example of aligning audio data based on the calibration sequence according to embodiments of the present disclosure. As illustrated in FIG. 7, the system 100 may receive audio data representing the calibration sound capture that is not synchronized, preventing the system 100 from measuring TDoA values between each pair of devices. For example, misaligned signals 710 illustrate four audio streams that are not synchronized with each other. To illustrate an example, the second device 110*b* (e.g., Device B) started capturing slightly before the first device 110*a* (e.g., Device A), making it appear that the audible sounds represented in the second audio data were captured later than the audible sounds represented in the first audio data. However, this results in the first audio data including a representation of the second audible sound generated by the second device 110*b* before the second audio data, which illustrates that the signals are misaligned.

To align the signals, the system 100 may determine midpoints between a pair of audible sounds captured by a pair of devices 110 and then align the midpoints. For example, the system 100 may determine a first midpoint in the first audio data between a first representation of the first audible sound and a first representation of the second audible sound (e.g., $0.5(t_{AA}+t_{BA})$), may determine a second midpoint in the second audio data between a second representation of the first audible sound and a second representation of the second audible sound (e.g., $0.5(t_{AB}+t_{BB})$), and may align the first midpoint with the second midpoint. As illustrated in FIG. 7, aligned signals 720 represent each of the audible sounds captured during the calibration sequence in an appropriate chronological order, enabling the system 100 to determine a time-of-flight between a pair of devices and/or a TDoA value associated with the pair of devices.

In the aligned signals 720, the captured audible sounds from each pair of devices form a symmetric trapezoid, with a first propagation delay from the first device 110*a* to the second device 110*b* being equal to a second propagation delay from the second device 110*b* to the first device 110*a*. The system 100 may determine delays to apply to each audio stream in order to align the audio data and ensure that the midpoints of the upper and lower base of the trapezoid are equal. For example, for N devices the system 100 may determine N(N−1)/2 discrete pairs (e.g., unique equations), along with N−1 independent variables (e.g., with one device arbitrarily chosen as a zero delay reference to align the audio streams). If AA denotes the delay applied to the first audio data, the equations are of the form:

$$2(\Delta_A-\Delta_B)=t_{AB}+t_{BB}-t_{BA}-t_{AA} \quad [1]$$

which leads to a system of equations (e.g., for an example including only three devices):

$$\begin{bmatrix} 2 & -2 & 0 \\ 2 & 0 & -2 \\ 0 & 2 & -2 \\ 1 & 1 & 1 \end{bmatrix} \begin{bmatrix} \Delta_A \\ \Delta_B \\ \Delta_C \end{bmatrix} = \begin{bmatrix} t_{AB}+t_{BB}-t_{BA}-t_{AA} \\ t_{AC}+t_{CC}-t_{CA}-t_{AA} \\ t_{BC}+t_{CC}-t_{CB}-t_{BB} \\ 0 \end{bmatrix} \quad [2]$$

In the example illustrated above, the fourth equation ensures that the average delay is equal to zero, although choosing a single reference device or using the average is arbitrary.

In some examples, the system 100 may estimate a time difference of arrival (TDoA) value between two devices by detecting when a known source signal (e.g., known excitation signal) is captured by each device and determining a time difference. For example, the system 100 may determine a first timestamp associated with the source signal being captured by the first device 110*a* (e.g., represented in first audio data generated by the first device 110*a*) and a second timestamp associated with the source signal being captured by the second device 110*b* (e.g., represented in second audio data generated by the second device 110*b*). By determining a difference between the first timestamp and the second timestamp, the system 100 may determine a first TDoA value associated with the first device 110*a* and the second device 110*b*. However, this technique is only accurate if the source signal is known ahead of time.

If the source signal is not known ahead of time, the system 100 may determine the TDoA value by taking a cross-correlation between the first audio data associated with the first device 110*a* and the second audio data associated with the second device 110*b*. For example, as the received signal (e.g., user speech) is highly correlated between the two devices 110*a*/110*b*, the system 100 may treat a second representation of the user speech associated with the second audio data as a delayed version of a first representation of the user speech associated with the first audio data. Thus, the system 100 may generate cross-correlation data using the first audio data and the second audio data and determine the first TDoA value by detecting a peak in the cross-correlation data.

Figure 8:
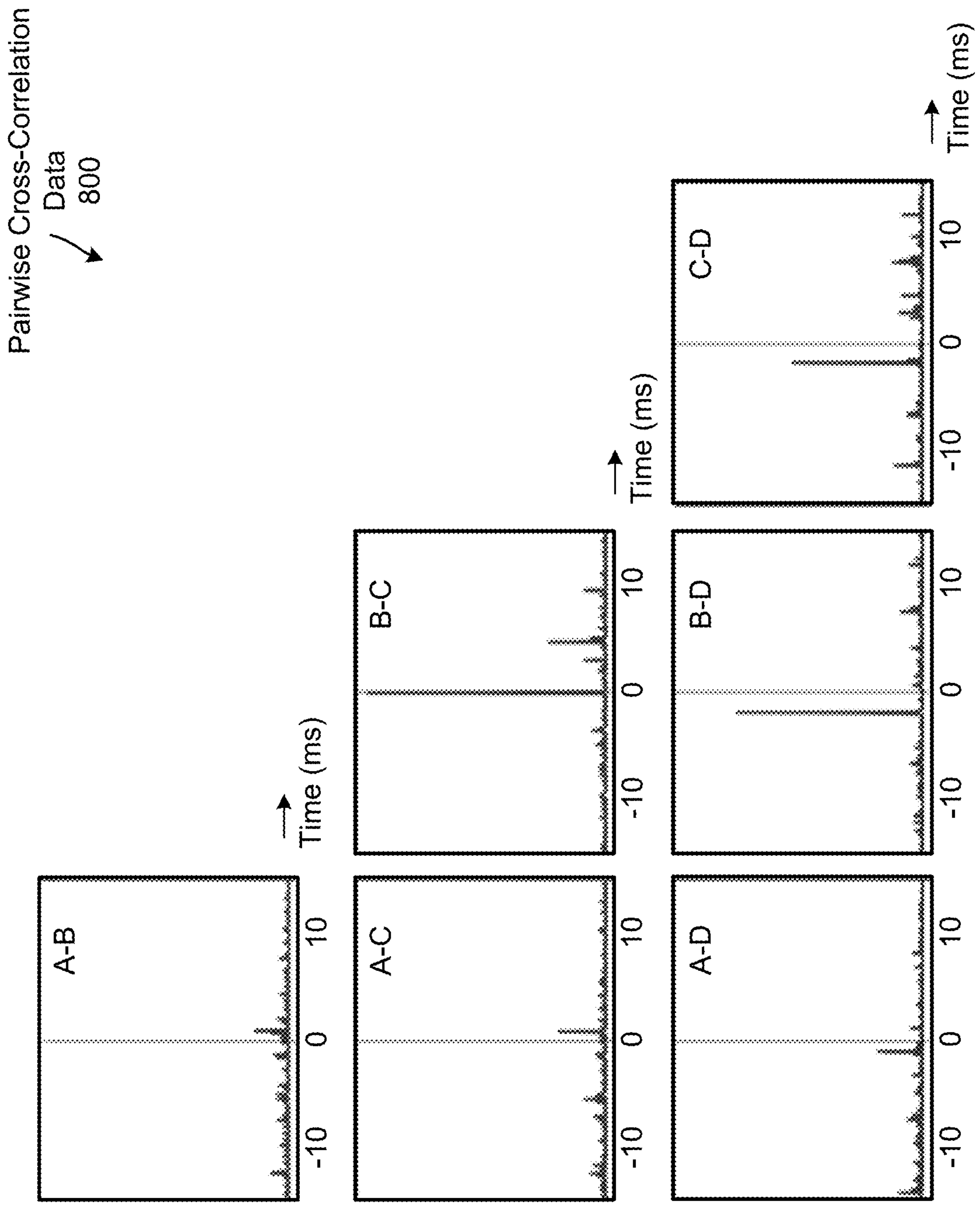
FIG. 8 illustrates an example of pairwise cross-correlation data used to perform user localization according to embodiments of the present disclosure.

FIG. 8 illustrates an example of pairwise cross-correlation data used to perform user localization according to embodiments of the present disclosure. As illustrated in FIG. 8, the fourth device 110*d* may generate pairwise cross-correlation data 800 by generating cross-correlation data for each pairwise combination of audio data. For example, the fourth device 110*d* may generate first pairwise cross-correlation data by taking a first cross-correlation between first audio data associated with the first device 110*a* and second audio data associated with the second device 110*b* (e.g., "A-B"), second pairwise cross-correlation data by taking a second cross-correlation between the first audio data and third audio data associated with the third device 110*c* (e.g., "A-C"), and third pairwise cross-correlation data by taking a third cross-correlation between the first audio data and fourth audio data associated with the fourth device 110*d* (e.g., "A-D").

Similarly, the fourth device 110*d* may generate fourth pairwise cross-correlation data by taking a fourth cross-correlation between the second audio data and the third audio data (e.g., "B-C"), fifth pairwise cross-correlation data by taking a fifth cross-correlation between the second audio data and the fourth audio data (e.g., "B-D"), and sixth pairwise cross-correlation data by taking a sixth cross-correlation between the third audio data and the fourth audio data (e.g., "C-D").

Using the pairwise cross-correlation data 800, in some examples the system 100 may determine estimated TDoA values for each pairwise combination. For example, the system 100 may determine a largest peak represented in the cross-correlation data for each pairwise combination without departing from the disclosure. However, this ignores potentially useful information represented in the pairwise cross-correlation data 800 and the disclosure is not limited thereto.

To benefit from the additional information represented in the pairwise cross-correlation data 800, such as secondary peaks that may represent a direct path time delay, the system 100 may estimate the TDoA value using steered response power, such as a simple delay-sum beamformer. For any candidate position x, the system 100 may calculate the distances to each microphone and delay each signal inversely to the delay. Thus, if the source is actually located at the candidate position z, the delayed versions of the emission will add together coherently, such that the overall power will be greater than for incorrect locations where the sum is not coherent. Specifically, if the system 100 defines the received signal from device i to be $s_i$, the steered response power is:

$$SRP(x) = \sum_t \left( \sum_i s_i \left[ t + \frac{1}{c} \| p_i - x \|_2 \right] \right)^2 \quad [3]$$

Figure 9:
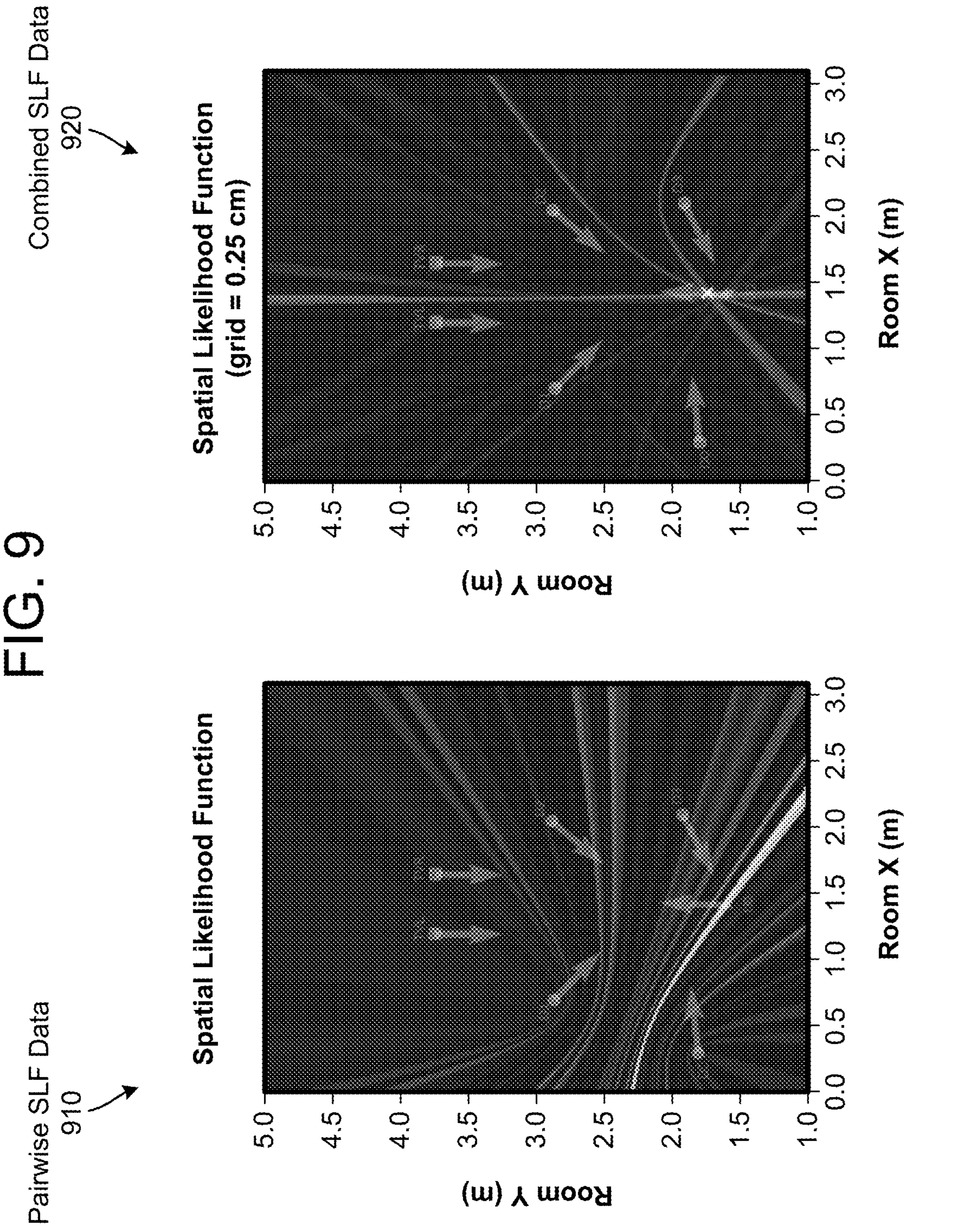
FIG. 9 illustrates examples of generating spatial likelihood functions according to embodiments of the present disclosure.

Evaluating at a grid of candidate points gives a plot similar to the examples illustrated in FIG. 9, with a pairwise plot illustrating the contribution of a single pair (e.g., the first device 110*a* and the second device 110*b*) and a combined plot illustrating the total contribution from all of the pairs (e.g., sum of the steered response power for each pairwise plot).

While $$\frac{1}{c} \| p_i - x \|_2$$

can be fractional, $s_i$ is a discrete signal, so the system 100 may apply interpolation (e.g., nearest-neighbor interpolation) without departing from the disclosure. For every evaluation point, the Steered Response Power calculated using Equation [3] needs to integrate across both time and devices, increasing a processing consumption. However, the SRP function may be mapped monotonically to a function of the cross-correlations:

$$SRP'(x) = \sum_{i=1}^{I} \sum_{j-i+1}^{I} (s_i * s_j)[\Delta t_{i,j}(x)] \quad [4]$$

where the cross-correlations $s_i$*$s_j$ can be pre-computed instead of repeated for each evaluation. This offers a substantial savings in the processing consumption required per grid evaluation. In some examples, the system 100 may replace the raw cross-correlation data with a Generalized Cross-Correlation Power Phase Transform (GCC-PHAT) to create a more temporally compact and spectrally-flat cross-correlation. For example, the system 100 may apply Steered Response Power Phase Transform (SRP-PHAT) without departing from the disclosure, which is beneficial particularly for delay estimation in reverberant environments.

FIG. 9 illustrates examples of generating spatial likelihood functions according to embodiments of the present disclosure. As described above, the system 100 may use Equation [4] to calculate the steered response power using the cross-correlations. As illustrated in FIG. 9, the steered response power can be represented as a spatial likelihood function. For example, pairwise SLF data 910 corresponds to a pairwise spatial likelihood function and represents the contribution of a single pair of devices (e.g., first device 110*a* and second device 110*b*). In contrast, combined SLF data 920 corresponds to a total spatial likelihood function illustrating the total contribution from all of the pairs of devices. For example, the system 100 may generate the combined SLF data 920 by summing the steered response power (SRP) values for each pair of devices.

As used herein, a spatial likelihood function represents an environment (e.g., search space) using a grid that comprises a plurality of grid cells or grid points (e.g., plurality of segments) having a uniform size. Thus, the system 100 may divide the search space into the plurality of grid cells and determine a spatial likelihood value for each grid cell. For example, the system 100 may determine a first spatial likelihood value associated with a first grid cell, and the first spatial likelihood value may indicate a first likelihood that the first grid cell corresponds to the sound source (e.g., the sound source is located within the first grid cell). Similarly, the system 100 may determine a second spatial likelihood value associated with a second grid cell, and the second spatial likelihood value may indicate a second likelihood that the second grid cell corresponds to the sound source (e.g., the sound source is located within the second grid cell). Thus, the spatial likelihood function indicates the relative likelihood that the sound source is located within each grid cell, enabling the system 100 to determine a maximum likelihood value and associate the maximum likelihood value with the location of the sound source.

In the examples illustrated in FIG. 9, an intensity of the likelihood value for an individual grid cell is represented by a color associated with the grid cell. For example, a lower likelihood value is represented as a darker color, while a higher likelihood value is represented as a lighter color. As shown in the pairwise SLF data 910, the pairwise SLF corresponds to multiple hyperbolic shapes, with one hyperbolic shape having a noticeably lighter color indicating that this hyperbolic shape has a highest likelihood of the multiple hyperbolic shapes. While the multiple hyperbolic shapes represented in the pairwise SLF data 910 are visible in the combined SLF data 920, a corresponding intensity of the likelihood values is lower relative to hyperbolic shapes associated with other pairwise spatial likelihood functions.

As shown in the combined SLF data 920, a maximum value of the SRP corresponds to an intersection of several hyperbolic shapes having highest likelihood values represented in the combined SLF data 920. As illustrated in FIG. 9, the maximum value is represented using a white symbol (e.g., x) and corresponds to an estimated location of the user (e.g., listening position 210). While not identical, the estimated location of the user is relatively close to a ground truth location of the user, which is represented using a star symbol (e.g., ★).

In some examples, the system 100 may evaluate SRP'(x) using a grid search, although the disclosure is not limited thereto and the system 100 may use more complicated schemes (e.g., particle filters) without departing from the disclosure. While the system 100 may generate the spatial likelihood functions using Equation [4], the system 100 may need to make assumptions and/or estimate initial values in order to evaluate SRP'(x) properly. For example, in some examples the system 100 may assume that the user is inside a bounding box formed by the devices 110*a*-110*d*, or that bounding box plus some buffer region(s) outside of it, without departing from the disclosure. However, the disclosure is not limited thereto, and in other examples the system 100 may incorporate Angle of Arrival (AoA) data to generate an initial guess of the user location without departing from the disclosure.

In order to accurately measure the time differences associated with the TDoA information, the devices 110*a*-110*e* must be time-aligned or synchronized. For example, the devices 110*a*-110*e* may leverage the calibration sequence described above with regard to FIG. 5 to align the audio data after the fact, although the disclosure is not limited thereto.

The combined SLF data 920 illustrated in FIG. 9 is represented using a very high-resolution grid (e.g., evaluating every 0.25 cm), which increases a processing complexity associated with the spatial likelihood function. For example, using the 0.25 cm grid for a search space of 4 m×4 m corresponds to performing 2,560,000 evaluations. The system 100 may reduce the number of evaluations by lowering the resolution, but reducing the resolution may reduce an accuracy and/or miss peaks represented in the cross-correlation data. For example, as the system 100 performs a lookup into the cross-correlation table for each evaluation, having grid points that are 10 cm apart from each other can correspond to cross-correlation lookups being as much as 0.3 ms apart (e.g., 5 samples at 16 kHz).

Figure 10:
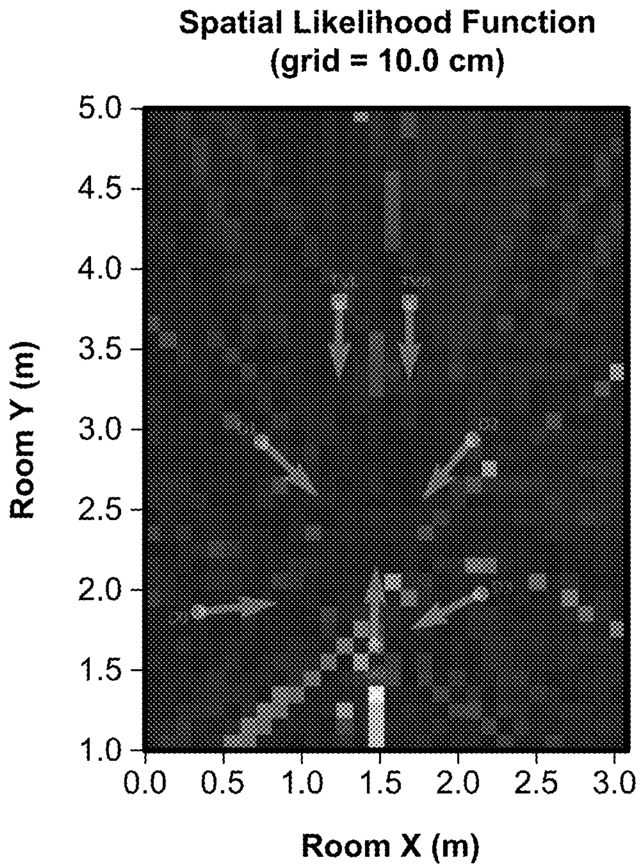
FIG. 10 illustrates an example of a low resolution spatial likelihood function according to embodiments of the present disclosure.

As it is common for cross-correlation peaks to be narrower than this, a low resolution grid creates the possibility that some cross-correlation peaks may be skipped entirely. FIG. 10 illustrates an example of a spatial likelihood function having a low resolution grid (e.g., evaluating every 10 cm). As shown by combined SLF data 1010 illustrated in FIG. 10, using the low resolution grid results in most of the hyperbola structure (e.g., hyperbolic shape) being lost.

Instead of evaluating the likelihood at a single point, the system 100 may integrate over the likelihood of the entire grid cell surrounding that point. Given the function of grid cells to pairwise TDoA, the system 100 may compute partial derivatives with respect to the likelihood evaluation point. This determines a range of the cross-correlation functions that will map to the grid cell, enabling the system 100 to combine all samples within the range without missing any peaks.

The system 100 may compute the TDoA range within each grid cell by finding a distance along the gradient until it hits the boundary of the grid cell. For example, the system 100 may use a maximum component of the gradient by itself to determine how quickly the gradient will hit the boundary. In some examples, the system 100 may determine the TDoA $\tau_{ij}$ between devices i and j, as a function of x, a two-dimensional (2D) or three-dimensional (3D) position. The TDoA is a scalar-valued function, and the system 100 may calculate its gradient with respect to x. For example, the system 100 may compute a vector Δx, which is the vector in the same direction as the gradient and which stops when it reaches the boundary of the grid cell.

Let $\alpha=\|\nabla\tau_{ij}\|_\infty$ (where the $L_\infty$-norm is the magnitude of the largest component). As the length of the corresponding component of ∇x will be length $$\frac{r}{2},$$

their ratio is $$\frac{r}{2\alpha}.$$

Because Δx is aligned with $\nabla\tau_{ij}$, the ratio of all their components is the same. This enables the system 100 to compute the whole Δx vector:

$$\Delta x = \frac{r\nabla\tau_{ij}}{2\alpha} \qquad [5]$$

To compute the range of TDoA spanned by the grid cell, the system 100 may take the inner product of the gradient and Δx, giving a final expression of:

$$\overline{\nabla\tau_{ij}}/\Delta \mathrm{x} = \frac{r\overline{\nabla\tau_{ij}}/\nabla\tau_{ij}}{2\alpha} = \frac{r|\nabla\tau_{ij}|^2}{2\|\nabla\tau_{ij}\|_\infty} \qquad [6]$$

As the gradient magnitude goes to zero, the numerator will shrink faster than the denominator, so for very small gradients the system 100 may replace the overall value with zero to avoid dividing by zero.

Figure 11:
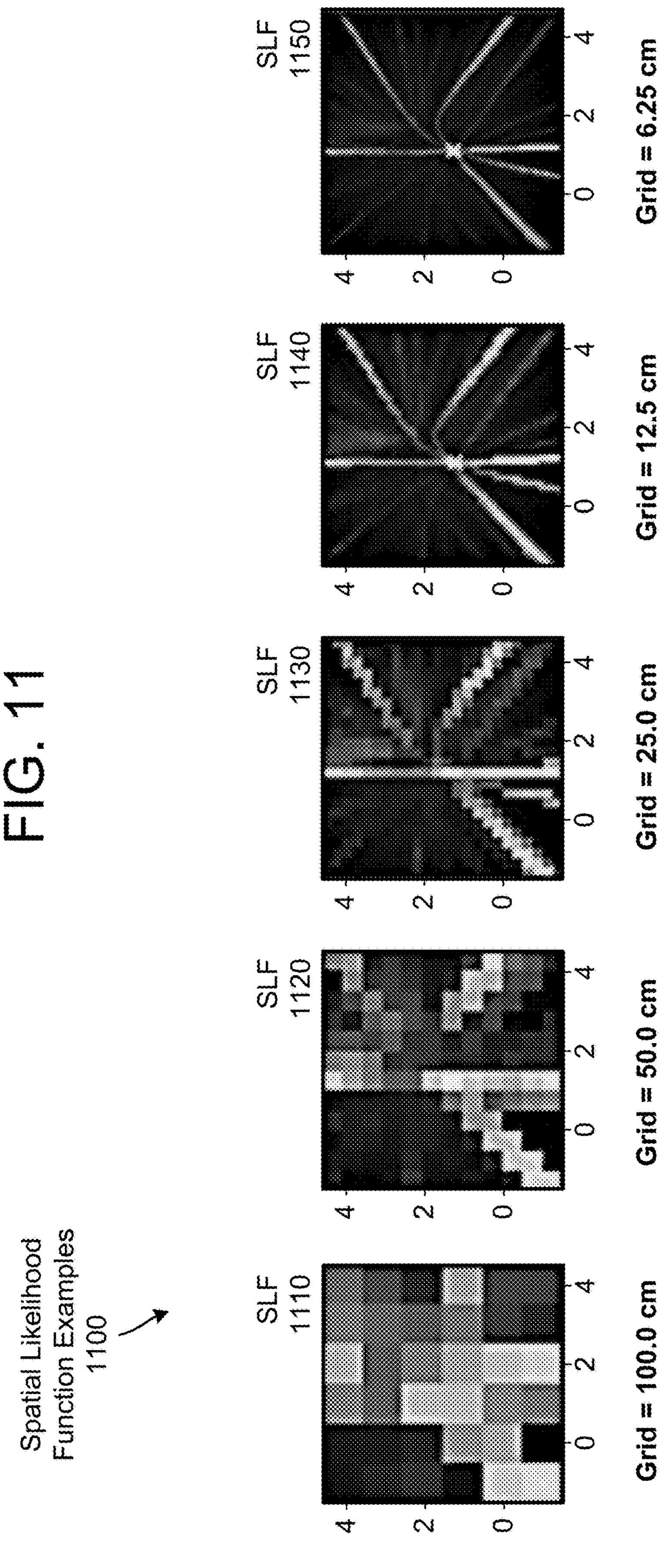
FIG. 11 illustrates examples of spatial likelihood functions with different resolutions according to embodiments of the present disclosure.

FIG. 11 illustrates examples of spatial likelihood functions with different resolutions according to embodiments of the present disclosure. As illustrated in FIG. 11, spatial likelihood function example 1100 illustrate examples of generating the spatial likelihood functions using different resolutions. For example, a first SLF 1110 uses a first grid size (e.g., 100.0 cm), a second SLF 1120 uses a second grid size (e.g., 50.0 cm), a third SLF 1130 uses a third grid size (e.g., 25.0 cm), a fourth SLF 1140 uses a fourth grid size (e.g., 12.5 cm), and a fifth SLF 1150 uses a fifth grid size (e.g., 6.25 cm).

The system 100 may combine the cross-correlation window for each evaluation using different window integration functions (e.g., combination function) without departing from the disclosure. For example, the spatial likelihood function examples 1100 illustrated in FIG. 11 correspond to using a window mean operation, but the disclosure is not limited thereto and the window integration function may correspond to a window sum operation (e.g., sum, logsum, etc.), a window max operation, and/or the like without departing from the disclosure.

As described above, there is a fundamental tradeoff between the resolution of the grid and the number of evaluations and corresponding processing complexity. For example, a high resolution grid may identify the sound source location with a greater accuracy, but at the cost of higher processing consumption. In contrast, a low resolution grid may reduce the processing consumption, but at the cost of decreasing the accuracy. To compromise between accuracy and complexity, the system 100 may use a multiresolution approach.

Figure 12:
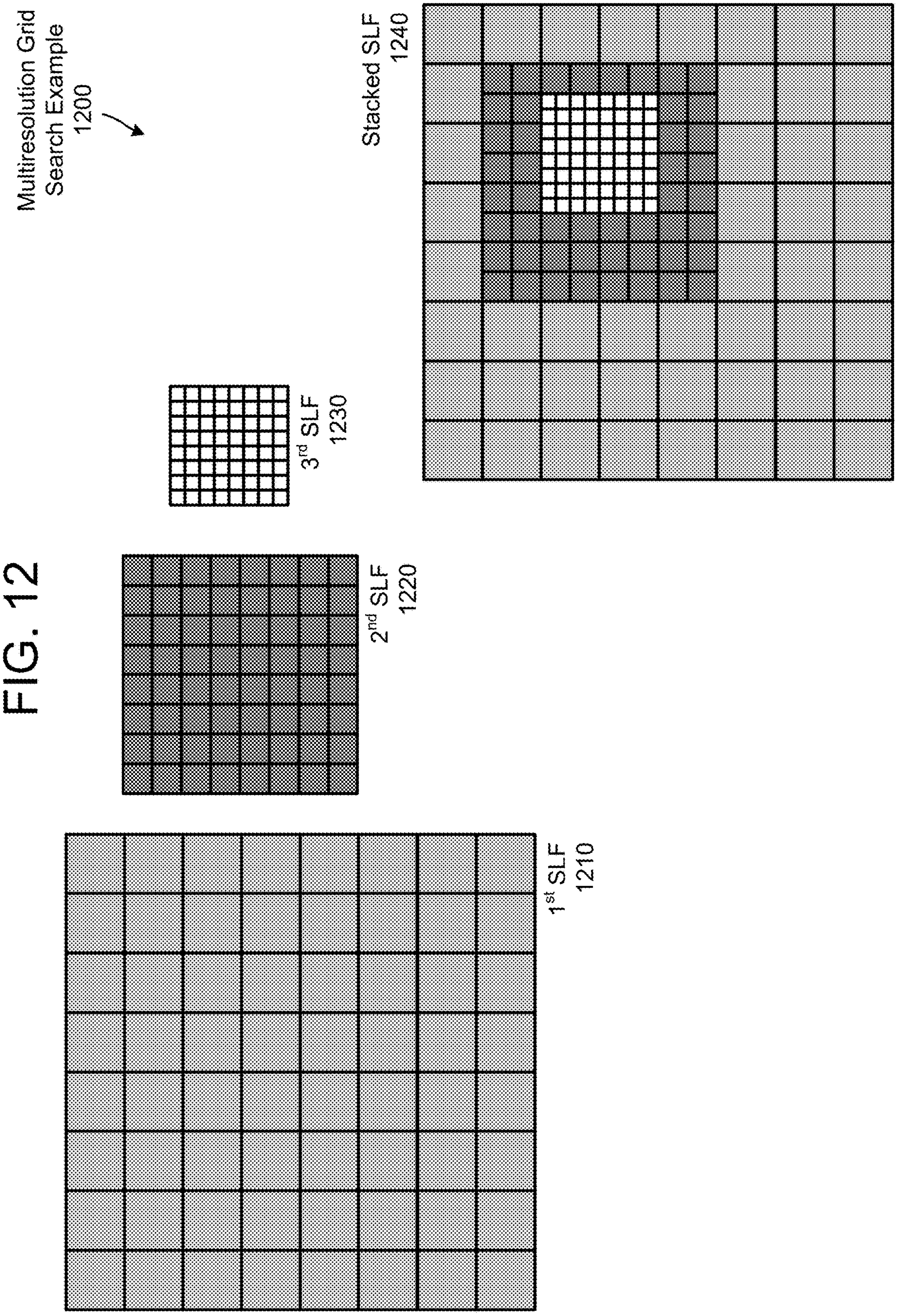
FIG. 12 illustrates an example of performing multiresolution grid search according to embodiments of the present disclosure.

FIG. 12 illustrates an example of performing multiresolution grid search according to embodiments of the present disclosure. In some examples, the system 100 may perform a multiresolution grid search by initially mapping the entire search space at a low resolution, then iteratively zooming into the area with the highest likelihood. The system 100 may maintain the number of evaluations at each zoom level constant while reducing the search space, giving progressively finer resolution. This provides large savings as it turns an $N^2$ complexity problem into a log(N) complexity problem.

To conceptually illustrate a simple example, FIG. 12 illustrates a multiresolution grid search example 1200 that includes three iterations. For example, a first SLF 1210 maps a first search space (e.g., 100% of an original search space) using an 8×8 grid having a first resolution (e.g., 4×), a second SLF 1220 reduces the first search space by 50% and maps a second search space (e.g., 50% of the original search space) using an 8×8 grid having a second resolution (e.g., 2×), and a third SLF 1230 reduces the second search space by 50% and maps a third search space (e.g., 25% of the original search space) using an 8×8 grid having a third resolution (e.g., x). Thus, the three spatial likelihood functions all include the same number of evaluations (e.g., 64 evaluations), but the first SLF 1210 is followed by progressively smaller and higher resolution grids.

For each iteration of the multiresolution grid search example 1200, the system 100 selects the next search space based on a highest likelihood of the previous spatial likelihood function. For example, the system 100 may identify a first area of the first SLF 1210 that includes a highest likelihood of first likelihood values and may select the second search space to include the first area. Similarly, the system 100 may identify a second area of the second SLF 1220 that includes a highest likelihood of second likelihood values and may select the third search space to include the second area. Thus, FIG. 12 illustrates an example of a stacked SLF 1240 that is generated by combining the first SLF 1210, the second SLF 1220, and the third SLF 1230. While FIG. 12 illustrates an example that includes three iterations, the disclosure is not limited thereto and the system 100 may perform any number of iterations without departing from the disclosure. For example, if the first search space corresponds to a 4 m×4 m region and the system 100 contracts by 50% for each iteration, the system 100 may start with a first resolution (e.g., 50 cm) and perform five iterations or contractions, for a final resolution (e.g., 3.125 cm) and a total of 320 evaluations. However, the disclosure is not limited thereto, and the system 100 may vary an amount of contraction without departing from the disclosure.

In some examples, the system 100 may assume that the device locations represented by the device location data 315 are accurate and that a precise location of each device 110 is known to the system 100. However, small errors in the estimated device locations may translate into errors represented in the resulting localization. In certain situations, the relationship can be highly nonlinear, such that small errors in sensor location cause large localization errors. However, this is largely due to situations where the devices 110 are in close proximity (e.g., very close to each other), and this is less of an issue when the device spacing is large relative to the device localization error.

Figure 13:
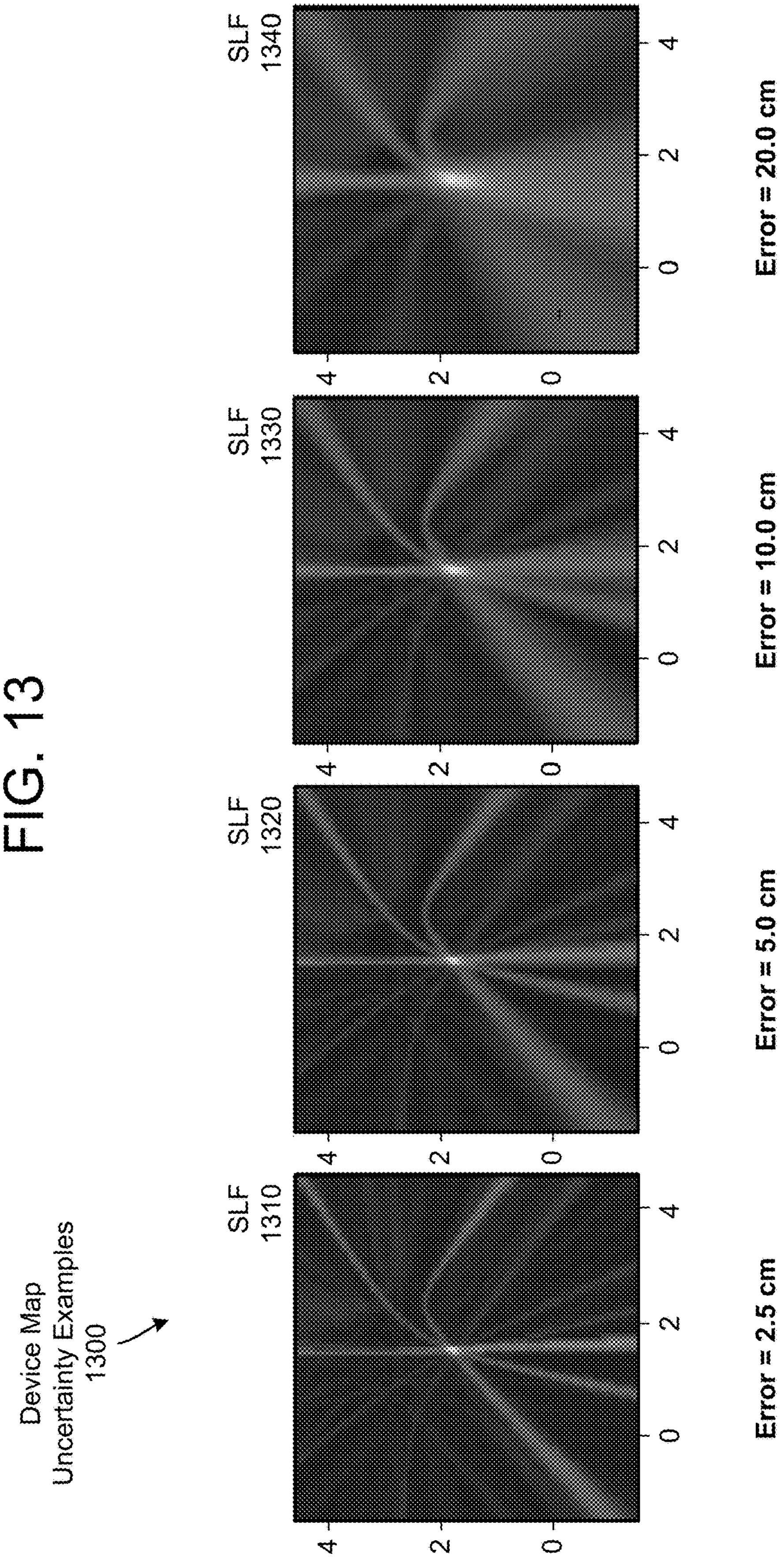
FIG. 13 illustrates examples of adjusting an amount of device map uncertainty according to embodiments of the present disclosure.

FIG. 13 illustrates examples of adjusting an amount of device map uncertainty according to embodiments of the present disclosure. The system 100 may adjust the likelihood model to account for the device localization error. For example, if the device error is assumed to be independent and Gaussian with a variance $\sigma^2$, the error in their relative time lag is $2\sigma^2$, so the standard deviation is $\sqrt{2}\sigma$. To account for this uncertainty, the system 100 may convolve the cross-correlation functions with a Gaussian with that variance. Thus, the system 100 may smooth out the cross-correlation data using the Gaussian function, which results in the spatial likelihood function also being smoothed. FIG. 13 illustrates device map uncertainty examples 1300 that show the likelihood functions with varying amounts of device error. For example, a first SLF 1310 illustrates a first device error (e.g., 2.5 cm), a second SLF 1320 illustrates a second device error (e.g., 5.0 cm), a third SLF 1330 illustrates a third device error (e.g., 10.0 cm), and a fourth SLF 1340 illustrates a fourth device error (e.g., 20.0 cm).

Figure 14:
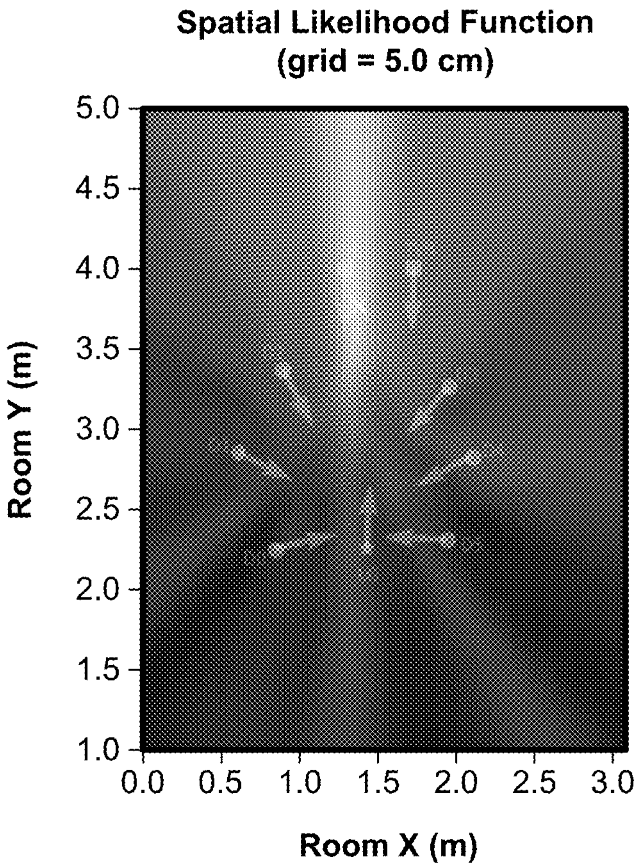
FIG. 14 illustrates an example of a spatial likelihood function under farfield conditions according to embodiments of the present disclosure.

FIG. 14 illustrates an example of a spatial likelihood function under farfield conditions according to embodiments of the present disclosure. The TDoA approach described above works best when the sound source to be localized is within the collection of devices 110 that comprise the flexible home theater. If the sound source is outside the collection of devices, the accuracy of the distance estimation degrades. For example, the localization enters a farfield implementation, in which the spatial likelihood function accurately indicates a direction towards the sound source (e.g., television) but includes a range of distances. FIG. 14 illustrates a farfield example 1400 in which the spatial likelihood function includes maximum likelihood values in a clear direction relative to the listening position 210, but the maximum likelihood values extend across multiple distance values. While the system 100 cannot accurately estimate the location of the television using the farfield example 1400, the system 100 may generate the user orientation data 350 based on the direction of the television relative to the user.

While the examples described above refer to using cross-correlation data to generate spatial likelihood functions that correspond to Time Difference of Arrival (TDoA) values, the disclosure is not limited thereto. In some examples, the system 100 may generate spatial likelihood functions using Angle of Arrival (AoA) data without departing from the disclosure. Additionally or alternatively, the system 100 may generate a spatial likelihood function using a combination of the TDoA spatial likelihood functions and the AoA spatial likelihood functions without departing from the disclosure.

As described above, the system 100 may determine relative AoA data, which indicates angle information relative to a device orientation, and/or absolute AoA data, which indicates angle information using a fixed frame of reference such as a global coordinate system. To illustrate an example of relative AoA data, a first device 110*a* may generate relative AoA data (e.g., relative AoA value) indicating that a second device 110*b* is in a first direction relative to a device orientation of the first device 110*a*. While the relative AoA data may enable the first device 110*a* to determine a relative position of the second device 110*b*, the relative AoA data varies based on the device orientation, which may not be known by other devices 110. Once the system 100 determines the device orientation of the first device 110*a*, the system 100 may use the device orientation and the relative AoA data to generate absolute AoA data, which indicates that the second device 110*b* is in a second direction relative to a location of the first device 110*a* within the grid. Thus, the system 100 may generate absolute AoA data that indicates angle values between each pair of devices using the global coordinate system.

Figure 15:
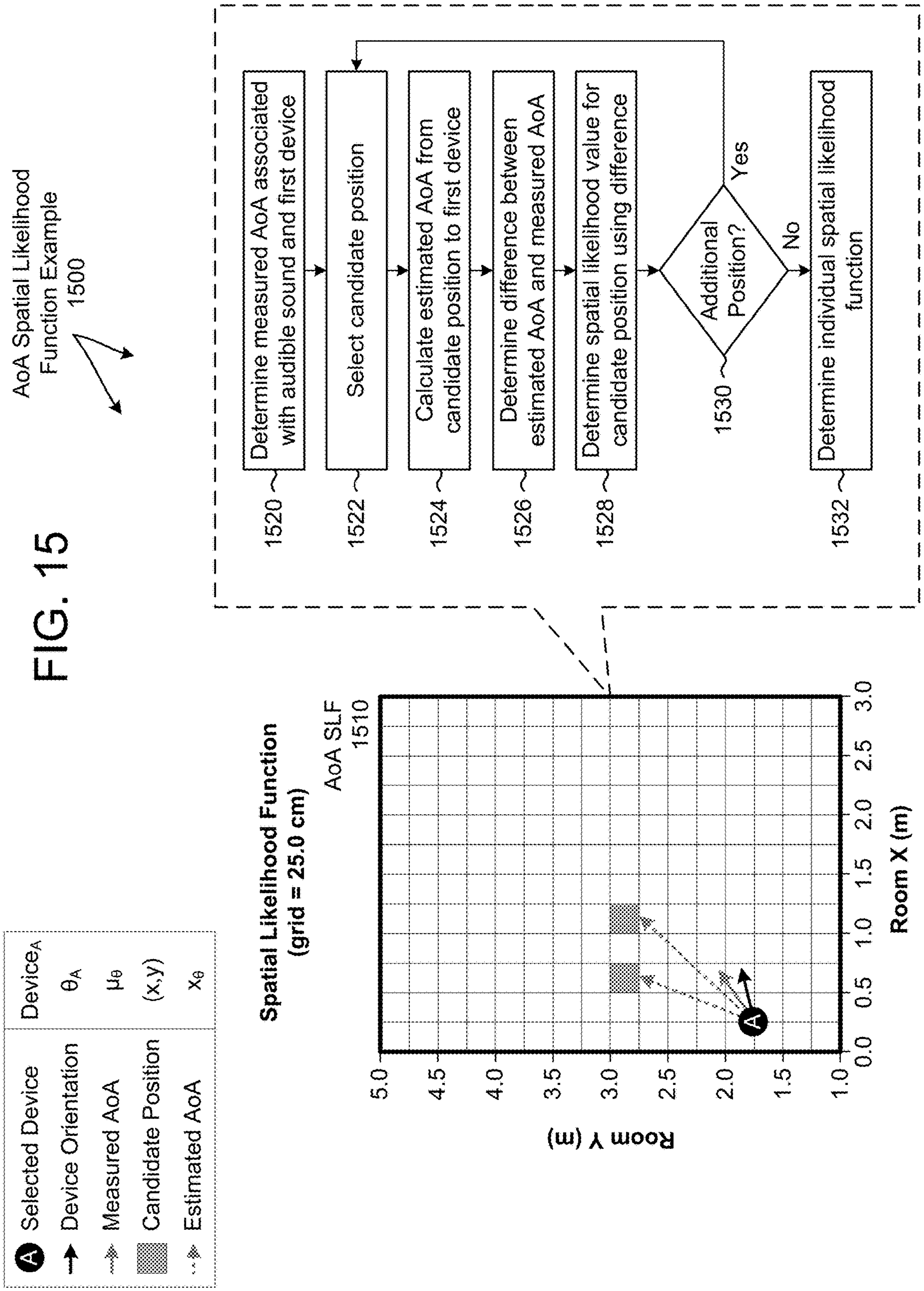
FIG. 15 illustrates an example of generating a spatial likelihood function using angle of arrival data according to embodiments of the present disclosure.

FIG. 15 illustrates an example of generating a spatial likelihood function using angle of arrival data according to embodiments of the present disclosure. As illustrated in AoA spatial likelihood function example 1500 shown in FIG. 15, the system 100 may use angle information of an audible sound relative to the first device 110*a* to generate an individual spatial likelihood function (e.g., AoA SLF 1510). For example, the first device 110*a* (e.g., $\text{Device}_A$) may generate audio data representing the audible sound (e.g., user speech, calibration output generated by a television, etc.) and may determine a measured AoA value corresponding to the audible sound. In some examples, the measured AoA value may be an absolute AoA value indicating that the sound source that generated the audible sound is in a first direction in the environment relative to the location of the first device 110*a*. However, the disclosure is not limited thereto and the measured AoA may be a relative AoA value indicating that the sound source is in a second direction relative to the device orientation (e.g., $\theta_A$) of the first device 110*a* without departing from the disclosure.

To calculate the spatial likelihood function, the system 100 may determine an estimated AoA value for each candidate position (e.g., grid cell, segment, etc.) and compare the estimated AoA value to the measured AoA value. To conceptually illustrate some examples, the AoA SLF 1510 includes two candidate positions along with their corresponding estimated AoA values. For example, a first candidate position (e.g., [3, 8]) may be associated with a first estimated AoA value (e.g., $x_{\theta 1}$), while a second candidate position (e.g., [5, 8]) is associated with a second estimated AoA value (e.g., $x_{\theta 2}$). To determine a first spatial likelihood value associated with the first candidate position, the system 100 may determine a first difference between the first estimated AoA value (e.g., $x_{\theta 1}$) and the measured AoA value (e.g., $\mu_\theta$). Similarly, the system 100 may determine a second spatial likelihood value associated with the second candidate position by determining a second difference between the second estimated AoA value (e.g., $x_{\theta 2}$) and the measured AoA value (e.g., $\mu_\theta$). Thus, the system 100 may determine individual spatial likelihood values for each candidate position represented in the AoA SLF 1510.

FIG. 15 includes a flowchart that illustrates these steps in more detail. As illustrated in FIG. 15, the system 100 may determine (1520) a measured AoA value associated with an audible sound and a first device (e.g., device capturing the audible sound), may select (1522) a candidate position, may calculate (1524) an estimated AoA value from the candidate position to the first device, may determine (1526) a difference between the estimated AoA value and the measured AoA value, and may determine (1528) a spatial likelihood value for the candidate position using the difference. The system 100 may then determine (1530) whether there is an additional candidate position, and if so, may loop to step 1522 and repeat steps 1522-1528 for the additional candidate position. Once the system 100 determines that there are no additional candidate positions, the system 100 may determine (1532) an individual spatial likelihood function using the spatial likelihood values determined in step 1528.

While FIG. 15 illustrates an example of generating an individual SLF for the first device 110*a*, the system 100 may generate individual SLFs for each of the devices 110 without departing from the disclosure. For example, the system 100 may generate a second SLF using a second measured AoA value associated with the audible sound and the second device 110*b*, a third SLF using a third measured AoA value associated with the audible sound and the third device 110*c*, and so on for each device 110 configured to generate audio data. After generating the individual SLFs, the system 100 may combine the SLF values to generate a combined AoA spatial likelihood function. Using the combined AoA spatial likelihood function, the system 100 may determine a location of the sound source that generated the audible sound (e.g., user, television, device, etc.). For example, the system 100 may identify a maximum likelihood value represented in the combined AoA spatial likelihood function and determine that the sound source is associated with a location corresponding to the maximum likelihood value.

While the example described above refers to the system 100 generating a plurality of individual SLFs and then using these SLFs to generate the combined AoA spatial likelihood function, the disclosure is not limited thereto. In some examples, the system 100 may calculate the combined AoA spatial likelihood function directly without departing from the disclosure. For example, the system 100 may determine the combined AoA spatial likelihood function using:

$$SLF_{AoA}(x;\mu_\theta;\sigma_\theta^2)=\sum\nolimits_N \frac{1}{\sigma_\theta(n)}\exp\left(-0.5\frac{\text{wrap}(f(x,n)-\mu_\theta(n))^2}{\sigma_\theta^2}\right) \quad [7]$$

where $SLF_{AoA}$ denotes the spatial likelihood function, x is a candidate position in the grid space, f(x, n) computes the AoA value from each point x to device n (e.g., $x_\theta(n)$), $\mu_\theta(n)$ denotes the measured AoA value to device n, $\sigma_\theta^2$ denotes the AoA variance (e.g., estimated from the 95' percentile), wrap( ) denotes a wrap function to maintain the angle values between $-\pi$ and $+\pi$, $\sigma_\theta(n)$ denotes the standard deviation, and N is the total number of devices. As illustrated in Equation [7], the standard deviation $\sigma_\theta(n)$ is used to inversely scale the values to provide a normalization constant that keeps the total area under the Gaussian constant. By inversely scaling using the standard deviation $\sigma_\theta(n)$, Equation [7] reduces a weighting associated with lower confidence (e.g., higher variance) information.

Evaluating the $SLF_{AoA}$ for a grid of candidate points provides a proxy likelihood function with which the system 100 may determine a location of the sound source. For example, the system 100 may select a candidate point using a maximum likelihood, such as:

$$\hat{x}=\underset{x}{\text{argmax}}\,SLF_{AoA}(x) \quad [8]$$

However, the disclosure is not limited thereto, and the system 100 may determine the location of the sound source using other techniques without departing from the disclosure.

Figure 16A:
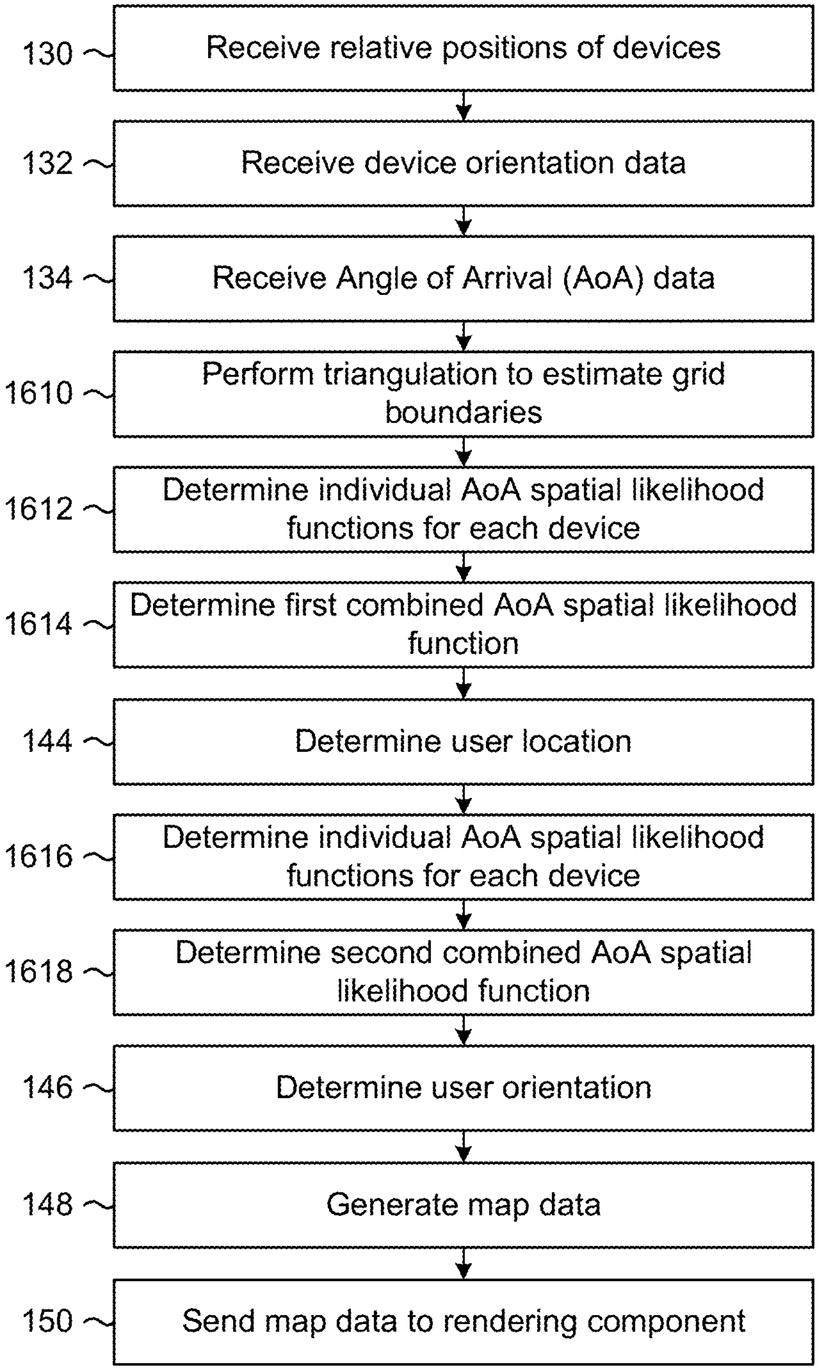
FIGS. 16A-16B are flowcharts conceptually illustrating example methods for generating and using spatial likelihood functions using angle of arrival data according to embodiments of the present disclosure.
Figure 16B:
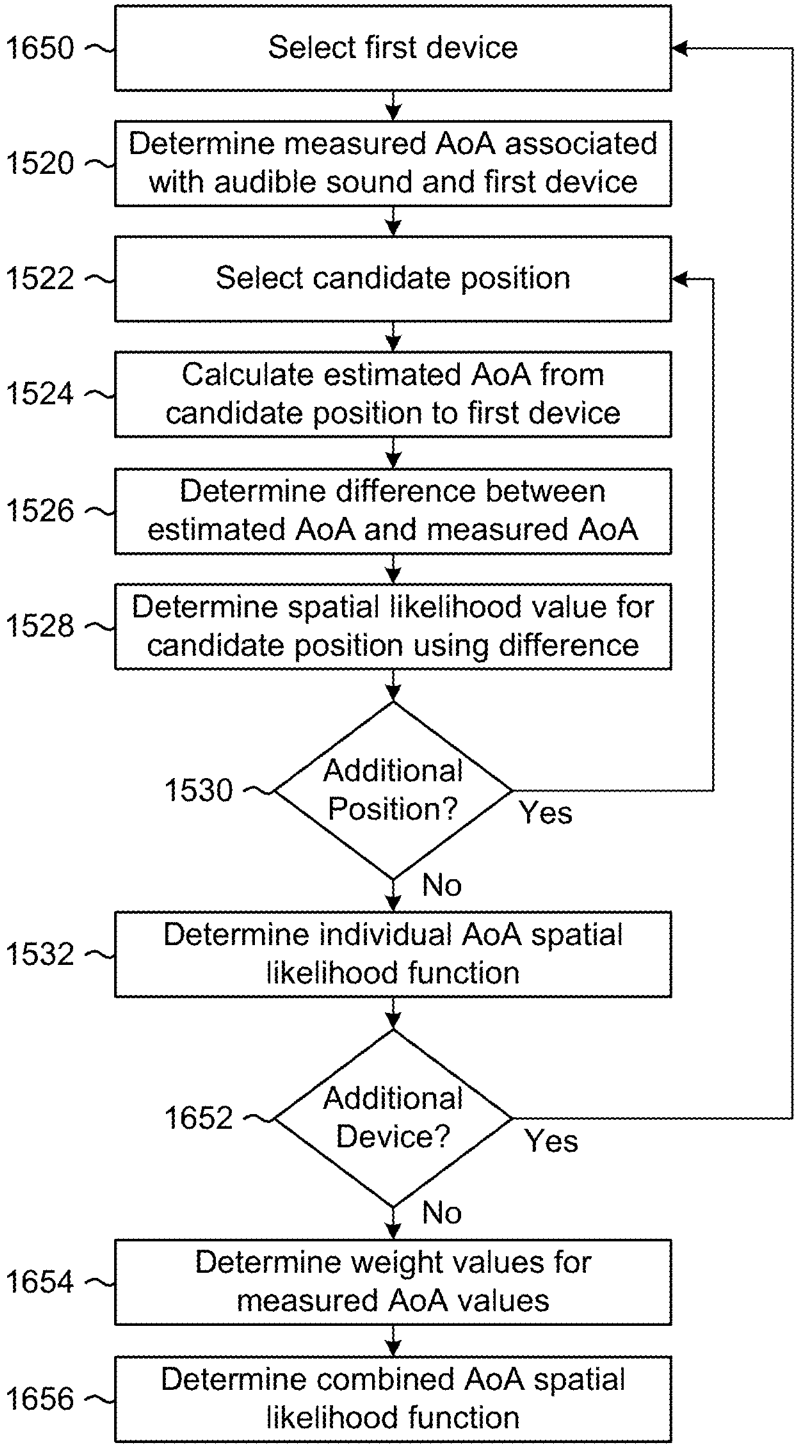

FIGS. 16A-16B are flowcharts conceptually illustrating example methods for generating and using spatial likelihood functions using angle of arrival data according to embodiments of the present disclosure. As illustrated in FIG. 16A, the system 100 may receive (130) relative positions of devices 110 and may receive (132) device orientation data, as described in greater detail above. In addition, the system 100 may receive (134) Angle of Arrival (AoA) data and may perform (1610) triangulation to estimate grid boundaries. For example, the system 100 may use the AoA data and the relative positions of the devices 110 to generate a first estimated location corresponding to the user and/or a second estimated location corresponding to the television, although the disclosure is not limited thereto. After performing triangulation, the system 100 may estimate the grid boundaries to include the first estimated location, the second estimated location, and the relative positions of the devices 110.

As illustrated in FIG. 16A, the system 100 may determine (1612) individual AoA spatial likelihood functions for each device based on a first audible sound (e.g., speech generated by the user), may determine (1614) a first combined AoA spatial likelihood function using the individual AoA SLFs, and may determine (144) a user location based on the first combined AoA spatial likelihood function. For example, the system 100 may determine a measured AoA value for each device and may determine the individual AoA SLFs as described above with regard to FIG. 15. However, the disclosure is not limited thereto, and in some examples the system 100 may generate the first combined AoA SLF directly using Equation [7], without determining the individual AoA SLFs, without departing from the disclosure.

In some examples, the system 100 may repeat these steps to determine a location and/or relative direction of the television. As illustrated in FIG. 16A, the system 100 may determine (1616) individual AoA spatial likelihood functions for each device based on a second audible sound (e.g., calibration output generated by the television), may determine (1618) a second combined AoA spatial likelihood function using the individual AoA SLFs, and may determine (146) a user orientation based on the second combined AoA spatial likelihood function. For example, the system 100 may determine the user orientation based on a direction of the television relative to the user location. Thus, even if the system 100 is unable to determine a precise location of the television, the system 100 may determine the user orientation as the direction of the television remains constant.

While FIG. 16A illustrates the system 100 performing steps 1616-1618, the disclosure is not limited thereto and the system 100 may determine the user orientation using other techniques without departing from the disclosure. Thus, the system 100 may determine the user orientation without performing steps 1616-1618 and/or determining the second combined AOA spatial likelihood function without departing from the disclosure.

Using the user location and the user orientation, the system 100 may generate (148) map data and may send (150) the map data to a rendering component, as described in greater detail above with regard to FIG. 1.

FIG. 16B illustrates a flowchart that expands on the flowchart illustrated in FIG. 15 to include multiple devices and/or to use weight values to determine the combined AoA SLF. As illustrated in FIG. 16B, the system 100 may select (1650) a first device and may determine (1520) a measured AoA value associated with an audible sound and a first device (e.g., device capturing the audible sound), select (1522) a candidate position, calculate (1524) an estimated AoA value from the candidate position to the first device, determine (1526) a difference between the estimated AoA value and the measured AoA value, and determine (1528) a spatial likelihood value for the candidate position using the difference. The system 100 may then determine (1530) whether there is an additional candidate position, and if so, may loop to step 1522 and repeat steps 1522-1528 for the additional candidate position. Once the system 100 determines that there are no additional candidate positions, the system 100 may determine (1532) an individual spatial likelihood function using the spatial likelihood values determined in step 1528.

After generating the individual spatial likelihood function associated with the first device, the system 100 may determine (1652) whether there is an additional device that captured the audible sound and may loop to step 1650 to select the additional device. For example, the system 100 may repeat steps 1520-1532 to generate an individual spatial likelihood function for the additional device.

Once the system 100 determines that there are no additional devices, the system 100 may determine (1654) weight values for the measured AoA values. For example, the system 100 may determine a first weight value corresponding to a first measured AoA value generated by the first device 110*a*, a second weight value corresponding to a second measured AoA value generated by the second device 110*b*, and so on for each measured AoA value.

To illustrate an example, as part of generating the first measured AoA value, the system 100 may also determine a first variance associated with the first measured AoA value. The term variance refers to a statistical measurement of the spread between numbers in a data set, with a large variance indicating that the numbers are far from the mean and from each other. Thus, the system 100 may use the first variance as a proxy for a confidence score that indicates a likelihood that the first measured AoA value is accurate. For example, a large variance may correspond to a low confidence score (e.g., low likelihood that the first measured AoA value is accurate), while a small variance may correspond to a high confidence score (e.g., high likelihood that the first measured AoA value is accurate). Based on the first variance, the system 100 may determine the first weight value, which is associated with the first measured AoA value and a corresponding first individual AoA SLF.

As illustrated in FIG. 16B, the system 100 may determine (1656) a combined AoA spatial likelihood function. In some examples, the system 100 may determine the combined AoA spatial likelihood function using the individual AoA SLFs and the weight values. For example, the system 100 may use the weight values to generate a weighted sum of the individual AoA SLFs, such that the combined AoA spatial likelihood function prioritizes the individual AoA SLFs associated with a higher weight value (e.g., smaller variance). However, the disclosure is not limited thereto and the system 100 may determine the combined AoA spatial likelihood function using the individual AoA SLFs and not the weight values without departing from the disclosure.

Figure 17A:
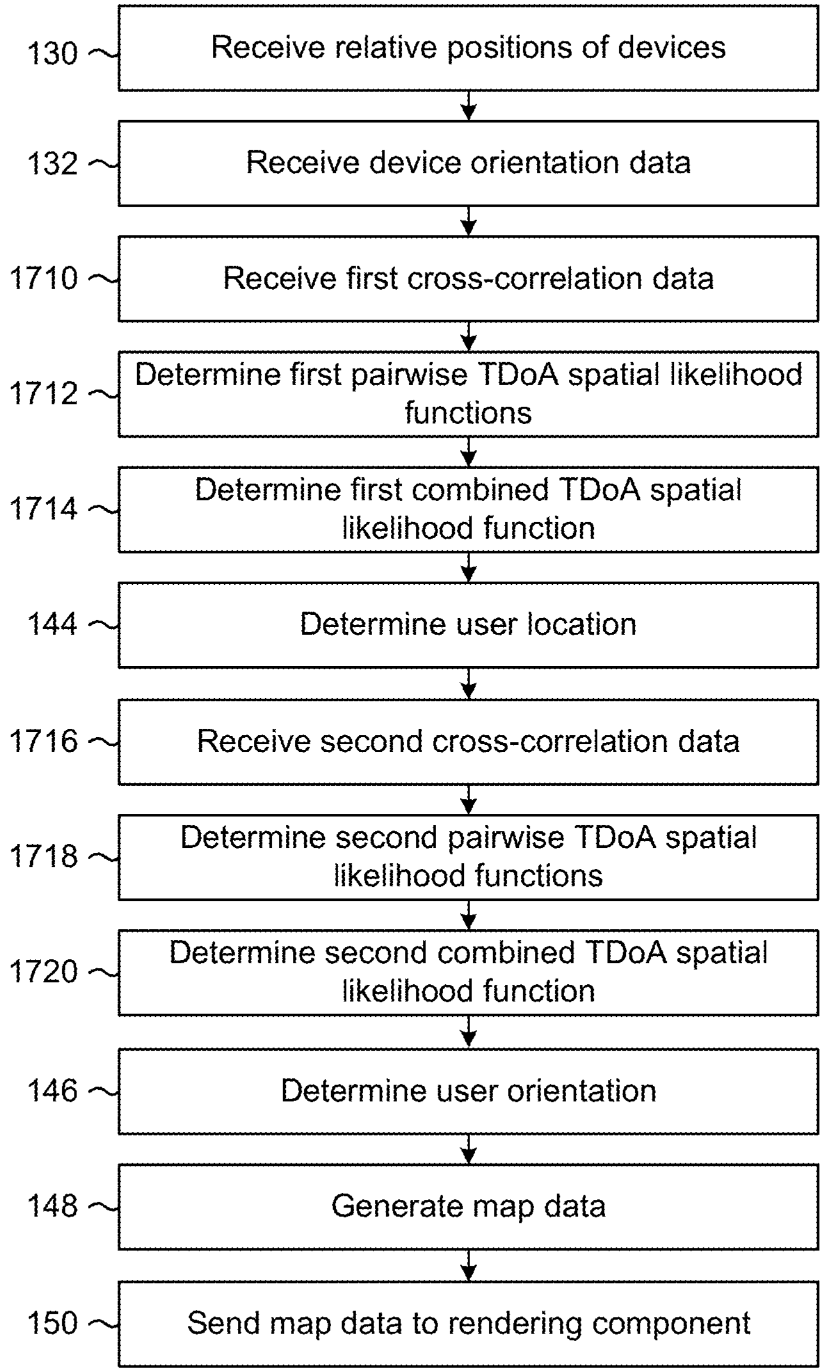
FIGS. 17A-17B are flowcharts conceptually illustrating example methods for generating and using spatial likelihood functions using time difference of arrival data according to embodiments of the present disclosure.
Figure 17B:
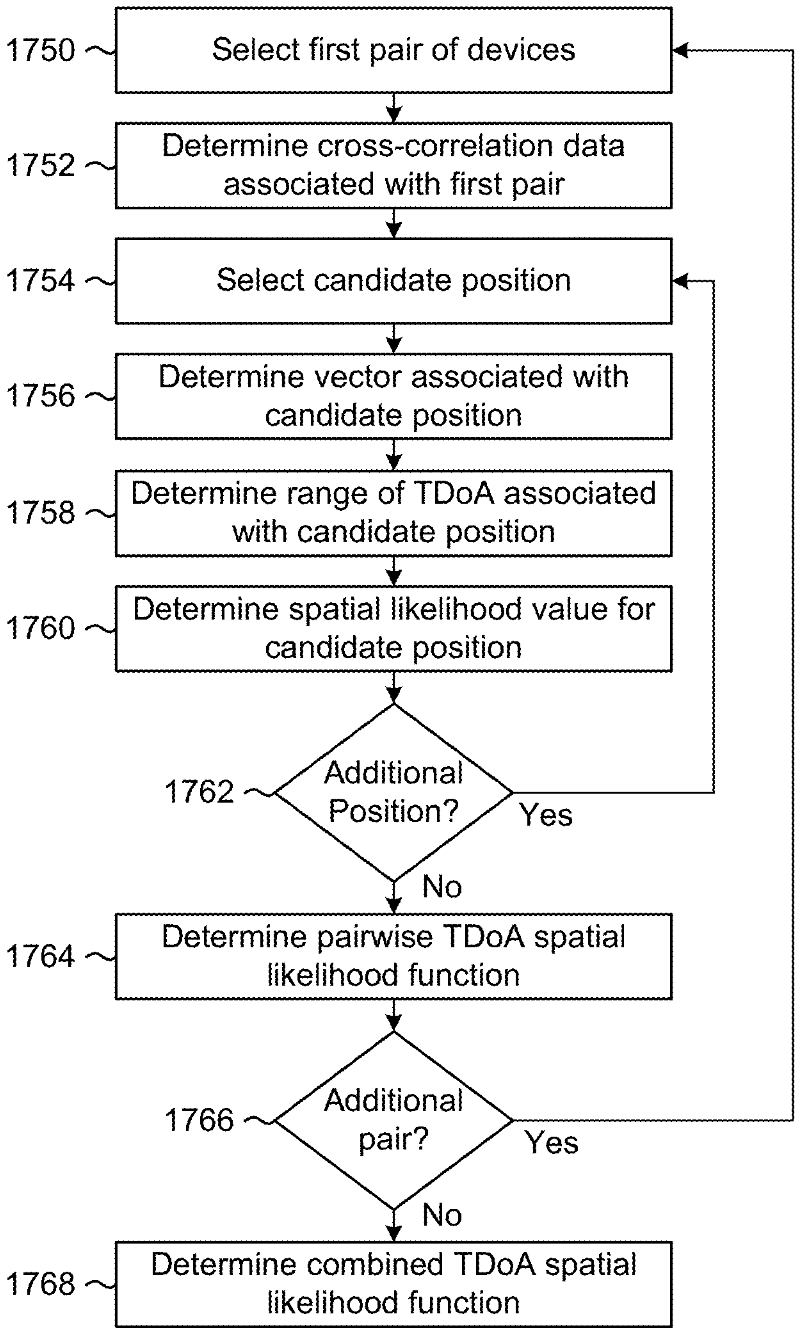

FIGS. 17A-17B are flowcharts conceptually illustrating example methods for generating and using spatial likelihood functions using time difference of arrival data according to embodiments of the present disclosure. As illustrated in FIG. 17A, the system 100 may receive (130) relative positions of devices 110 and may receive (132) device orientation data, as described in greater detail above. In addition, the system 100 may receive (1710) first cross-correlation data corresponding to a first audible sound (e.g., speech generated by the user), may determine (1712) first pairwise TDoA spatial likelihood functions for each pair of devices, may determine (1714) a first combined TDoA spatial likelihood function using the first pairwise TDoA SLFs, and may determine (144) a user location based on the first combined TDoA spatial likelihood function. For example, the system 100 may determine the first combined TDoA spatial likelihood function as described in greater detail above with regard to FIGS. 9-14, and may determine the user location based on a maximum spatial likelihood value represented in the first combined TDoA spatial likelihood function.

In some examples, the system 100 may repeat these steps to determine a location and/or relative direction of the television. As illustrated in FIG. 17A, the system 100 may receive (1716) second cross-correlation data corresponding to a second audible sound (e.g., calibration output generated by the television), may determine (1718) second pairwise TDoA spatial likelihood functions for each pair of devices, may determine (1720) a second combined TDoA spatial likelihood function using the second pairwise TDoA SLFs, and may determine (146) a user orientation based on the second combined TDoA spatial likelihood function. For example, the system 100 may determine the user orientation based on a direction of the television relative to the user location. Thus, even if the system 100 is unable to determine a precise location of the television, the system 100 may determine the user orientation as the direction of the television remains constant.

While FIG. 17A illustrates the system 100 performing steps 1716-1720, the disclosure is not limited thereto and the system 100 may determine the user orientation using other techniques without departing from the disclosure. Thus, the system 100 may determine the user orientation without performing steps 1716-1720 and/or determining the second combined TDoA spatial likelihood function without departing from the disclosure.

Using the user location and the user orientation, the system 100 may generate (148) map data and may send (150) the map data to a rendering component, as described in greater detail above with regard to FIG. 1.

FIG. 17B is a detailed flowchart illustrating specific steps involved in determining the combined TDoA spatial likelihood function. As illustrated in FIG. 17B, the system 100 may select (1750) a first pair of devices and may determine (1752) cross-correlation data associated with the first pair of devices and an audible sound. The system 100 may select (1754) a candidate position, determine (1756) a vector associated with the candidate position, determine (1758) a range of TDoA values associated with the candidate position, and determine (1760) a spatial likelihood value for the candidate position based on the range of TDoA values.

The system 100 may then determine (1762) whether there is an additional candidate position, and if so, may loop to step 1754 and repeat steps 1754-1760 for the additional candidate position. Once the system 100 determines that there are no additional candidate positions, the system 100 may determine (1764) a pairwise TDoA spatial likelihood function using the spatial likelihood values determined in step 1760.

After generating the pairwise TDoA spatial likelihood function associated with the first pair of devices, the system 100 may determine (1766) whether there is an additional pair of devices that captured the audible sound and may loop to step 1750 to select the additional pair. For example, the system 100 may repeat steps 1750-1764 to generate a pairwise TDoA spatial likelihood function for the additional pair of devices. Once the system 100 determines that there are no additional pairs, the system 100 may determine (1768) a combined TDoA spatial likelihood function.

Figure 18:
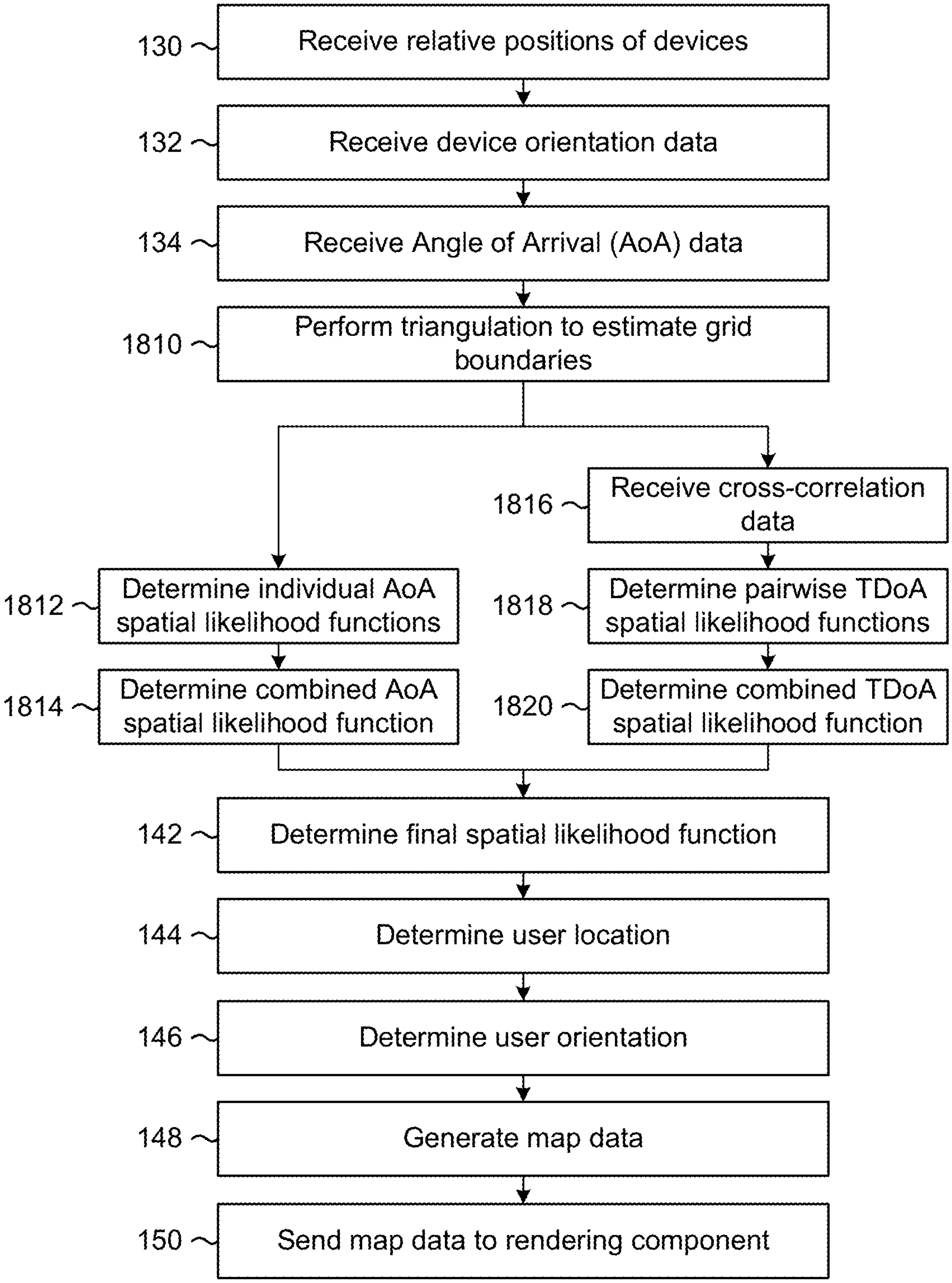
FIG. 18 is a flowchart conceptually illustrating an example method for generating and using a spatial likelihood function using a combination of angle of arrival data and time difference of arrival data according to embodiments of the present disclosure.

FIG. 18 is a flowchart conceptually illustrating an example method for generating and using a spatial likelihood function using a combination of angle of arrival data and time difference of arrival data according to embodiments of the present disclosure. As illustrated in FIG. 18, the system 100 may receive (130) relative positions of devices 110 and may receive (132) device orientation data, as described in greater detail above with regard to FIG. 1. In addition, the system 100 may receive (134) Angle of Arrival (AoA) data and may perform (1810) triangulation to estimate grid boundaries. For example, the system 100 may use the AoA data and the relative positions of the devices 110 to generate a first estimated location corresponding to the user and/or a second estimated location corresponding to the television, although the disclosure is not limited thereto. After performing triangulation, the system 100 may estimate the grid boundaries to include the first estimated location, the second estimated location, and the relative positions of the devices 110.

In some examples, the system 100 may generate a final spatial likelihood function using a combination of the AoA processing and the TDoA processing described above. For example, the system 100 may perform the AoA processing and the TDoA processing in parallel, resulting in the final spatial likelihood function being more accurate than a spatial likelihood function generated using either AoA processing or TDoA processing alone.

As illustrated in FIG. 18, the system 100 may determine (1812) individual AoA spatial likelihood functions for each device based on a first audible sound (e.g., speech generated by the user) and may determine (1814) a combined AoA spatial likelihood function using the individual AoA SLFs. For example, the system 100 may determine a measured AoA value for each device and may determine the individual AoA SLFs as described above with regard to FIG. 15. However, the disclosure is not limited thereto, and in some examples the system 100 may generate the combined AoA SLF directly using Equation [7], without determining the individual AoA SLFs, without departing from the disclosure.

In addition, the system 100 may receive (1816) cross-correlation data associated with the first audible sound, may determine (1818) pairwise TDoA spatial likelihood functions for each pair of devices, and may determine (1820) a combined TDoA spatial likelihood function using the pairwise TDoA SLFs. For example, the system 100 may determine the combined TDoA spatial likelihood function as described in greater detail above with regard to FIGS. 9-14, although the disclosure is not limited thereto.

After performing both AoA processing and TDoA processing, the system 100 may determine (142) a final spatial likelihood function using the combined AoA spatial likelihood function and the combined TDoA spatial likelihood function. The system 100 may combine the two estimated spatial likelihood functions using a variety of techniques without departing from the disclosure. For example, the system 100 may combine the two estimated spatial likelihood functions using a log-likelihood operation, as shown below:

$$SLF_{final}(x) = \log\left(\frac{SLF_{AoA}(x)}{\sum SLF_{AoA}}\right) + \log\left(\frac{SLF_{TDoA}(x)}{\sum SLF_{TDoA}}\right) \quad [9]$$

where $SLF_{final}(x)$ denotes the final spatial likelihood function, $SLF_{AOA}(x)$ denotes the combined AoA spatial likelihood function, and $SLF_{TDoA}(X)$ denotes the combined TDoA spatial likelihood function.

The system 100 may determine (144) the user location based on the final spatial likelihood function. For example, the system 100 may determine the user location based on a maximum spatial likelihood value represented in the final spatial likelihood function:

$$\hat{x} = \underset{x}{\mathrm{argmax}}\left(SLF_{final}(x)\right) \quad [10]$$

In some examples, the system 100 may determine the user location without explicitly determining the final spatial likelihood function. For example, the system 100 may determine the maximum spatial likelihood value directly using the combined AoA spatial likelihood function and the combined TDoA spatial likelihood function, as shown below:

$$\hat{x} = \underset{x}{\mathrm{argmax}}\left(\log\left(\frac{SLF_{AoA}(x)}{\sum SLF_{AoA}}\right) + \log\left(\frac{SLF_{TDoA}(x)}{\sum SLF_{TDoA}}\right)\right) \quad [11]$$

After determining the user location, the system 100 may determine (146) a user orientation based on a direction of the television relative to the user location. Thus, even if the system 100 is unable to determine a precise location of the television, the system 100 may determine the user orientation as the direction of the television remains constant. In some examples, the system 100 may determine the user orientation by repeating steps 1812-1820 to generate a second spatial likelihood function associated with the television, and using the second spatial likelihood function to determine a location of the television and/or direction of the television relative to the user. However, the disclosure is not limited thereto and the system 100 may determine the user orientation using other techniques without departing from the disclosure. For example, the system 100 may determine the user orientation without generating another spatial likelihood function without departing from the disclosure.

Using the user location and the user orientation, the system 100 may generate (148) map data and may send (150) the map data to a rendering component, as described in greater detail above with regard to FIG. 1.

While not illustrated in FIGS. 16A-18, in some examples the system 100 may determine the SLFs using the multi-resolution grid search technique described above with regard to FIG. 12. For example, while FIG. 18 illustrates the system 100 generating the combined AoA SLF, the combined TDoA SLF, and the final SLF as discrete steps performed once, the disclosure is not limited thereto. Instead, the system 100 may iteratively perform these steps with varying resolutions without departing from the disclosure. Additionally or alternatively, the system 100 may use the multiresolution grid search technique as part of determining the combined AoA SLF and the combined TDoA SLF, such that the combined AoA SLF may have different resolution and/or complexity than the combined TDoA SLF without departing from the disclosure.

While not illustrated in FIGS. 16A-18, in some examples the system 100 may determine a confidence score associated with the SLF and use the confidence score as feedback indicating whether the SLF is accurate. For example, the system 100 may use the confidence score to determine whether to use the SLF to determine the user location or whether to discard the SLF and repeat the steps to generate a new SLF.

Figure 19:
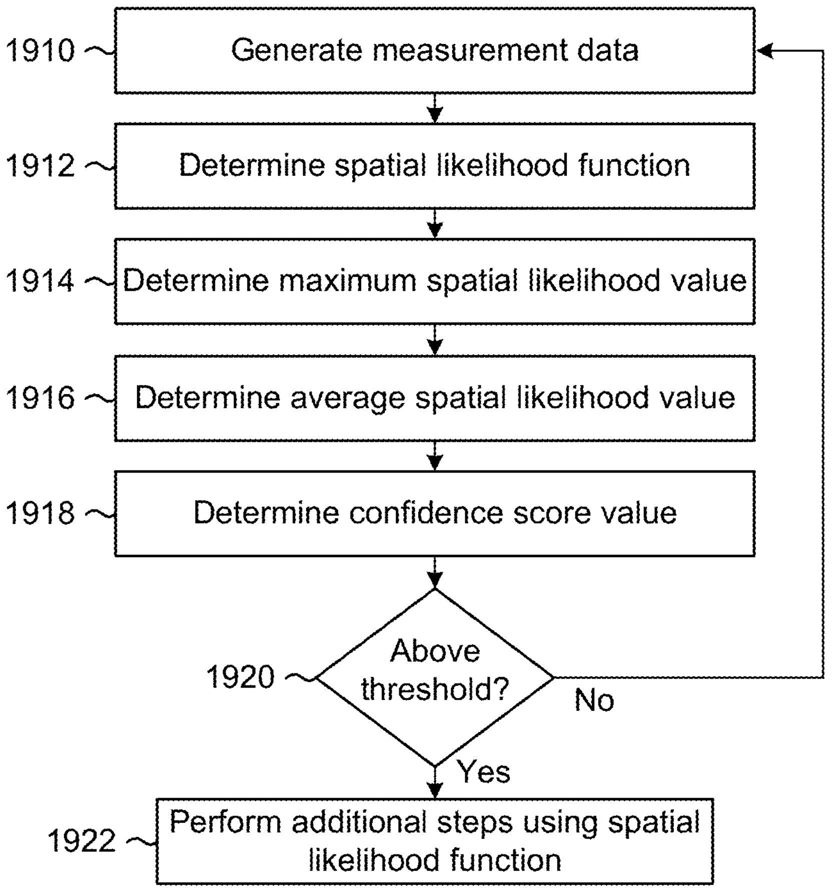
FIG. 19 is a flowchart conceptually illustrating an example method for determining a confidence score associated with a spatial likelihood function according to embodiments of the present disclosure.

FIG. 19 is a flowchart conceptually illustrating an example method for determining a confidence score associated with a spatial likelihood function according to embodiments of the present disclosure. As illustrated in FIG. 19, the system 100 may generate (1910) measurement data and determine (1912) a spatial likelihood function, as described in greater detail above. In addition, the system 100 may determine (1914) a maximum spatial likelihood value associated with the spatial likelihood function, determine (1916) an average spatial likelihood value associated with the spatial likelihood function, and determine (1918) a confidence score value. For example, the system 100 may determine the confidence score value as shown below:

$$conf = \frac{\max(SLF(x))}{\mathrm{mean}(SLF(x))} \quad [12]$$

After determining the confidence score value, the system 100 may determine (1920) whether the confidence score value exceeds a threshold value. If the confidence score value does not exceed the threshold value, the system 100 may loop to step 1910 and repeat steps 1910-1918 to generate a new spatial likelihood value. If the confidence score value exceeds the threshold value, the system 100 may perform (1922) additional steps using the spatial likelihood function, such as determining the user location and/or user orientation, as described in greater detail above. While FIG. 19 illustrates an example in which the system 100 compares the confidence score value to the threshold value, the disclosure is not limited thereto and the system 100 may determine that the confidence score value satisfies a condition using other techniques without departing from the disclosure.

Figure 20:
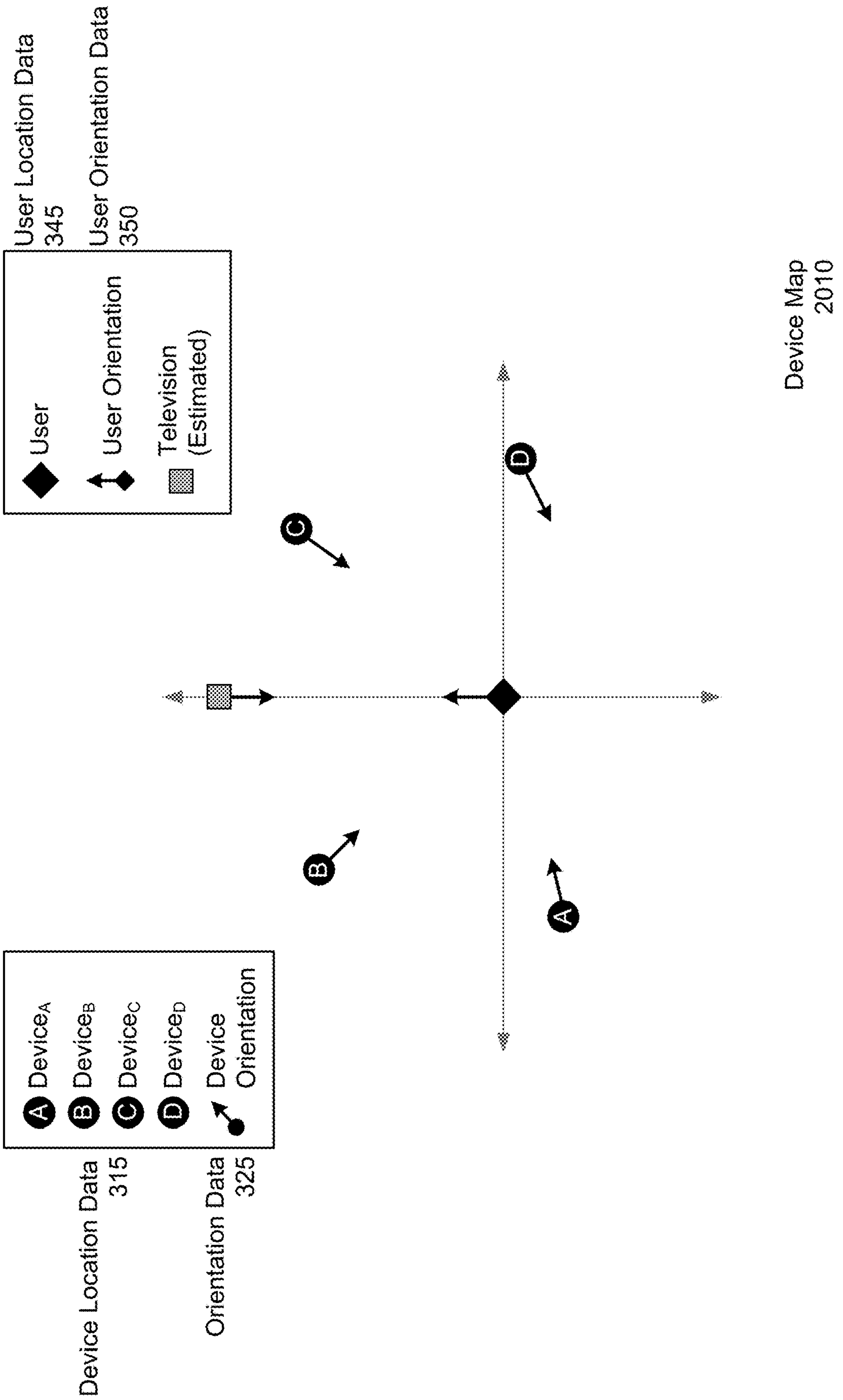
FIG. 20 illustrates an example of a device map with user location and orientation according to embodiments of the present disclosure.

FIG. 20 illustrates an example of a device map according to embodiments of the present disclosure. As illustrated in FIG. 20, a device map 2010 may represent the device location data 315 and the device orientation data 325 illustrated in FIG. 4, along with user localization data such as user location data 345 (e.g., listening position 210) and user orientation data 350 (e.g., orientation of the television relative to the listening position 210). For example, the device map 2010 represents the listening position 210 as a diamond at a first location (e.g., an origin of the device map 2010), an estimated position of the television as a square at a second location along the vertical axis from the listening position 210, the first device 110*a* as a first circle (e.g., "A") at a third location, the second device 110*b* as a second circle (e.g., "B") at a fourth location, the third device 110*c* as a third circle (e.g., "C") at a fifth location, and the fourth device 110*d* as a fourth circle (e.g., "D") at a sixth location. While the device map 2010 only illustrates four devices 110*a*-110*d*, the disclosure is not limited thereto and the device map 2010 may include any number of devices 110 without departing from the disclosure. Additionally or alternatively, while the device map 2010 represents the estimated position of the television at the second location, the disclosure is not limited thereto and in some examples the device map 2010 may be oriented such that the user orientation data 350 indicates that the television is along the vertical axis without indicating a specific location associated with the television without departing from the disclosure.

Figure 21:
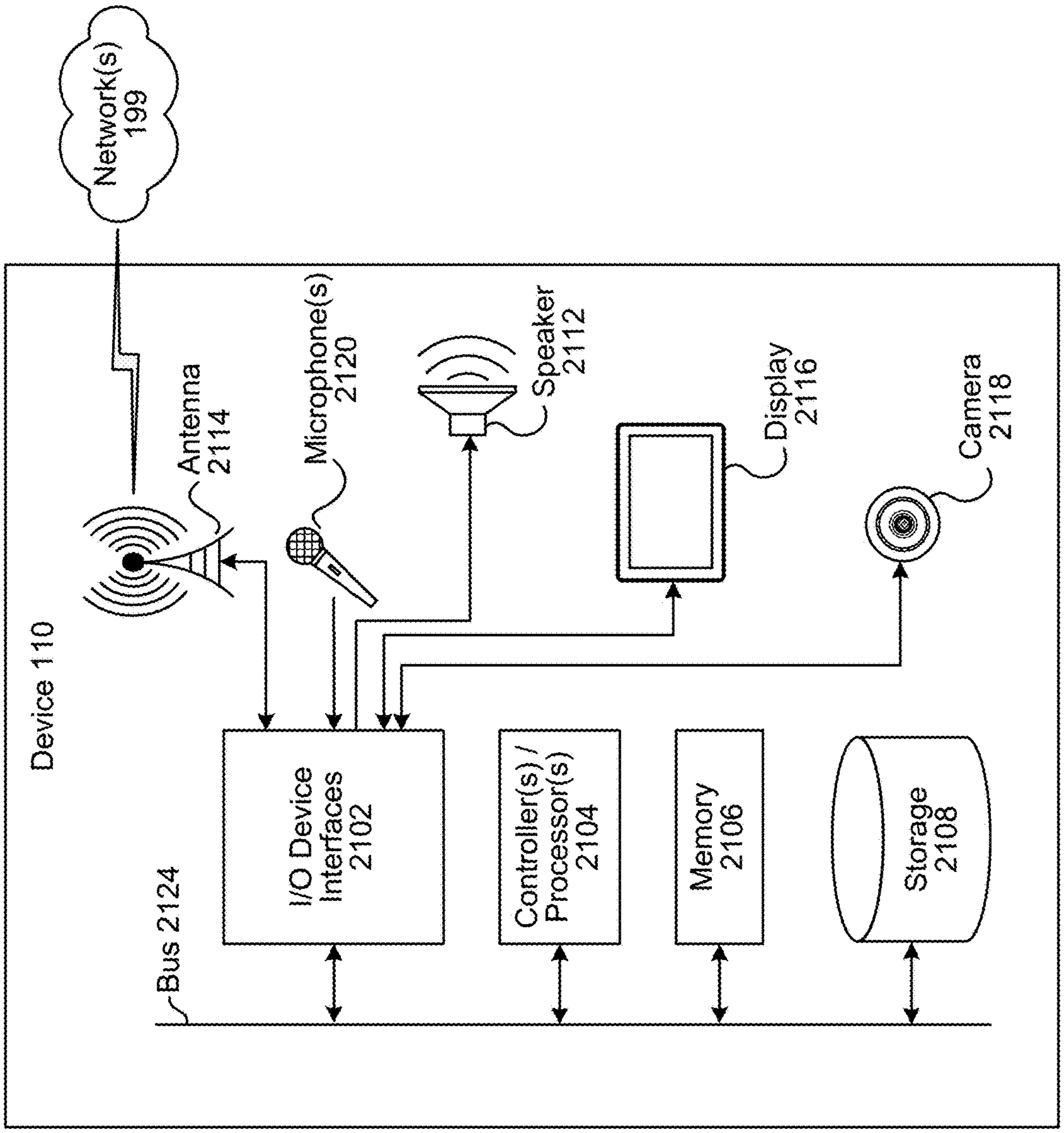
FIG. 21 is a block diagram conceptually illustrating example components of a device, according to embodiments of the present disclosure.
Figure 22:
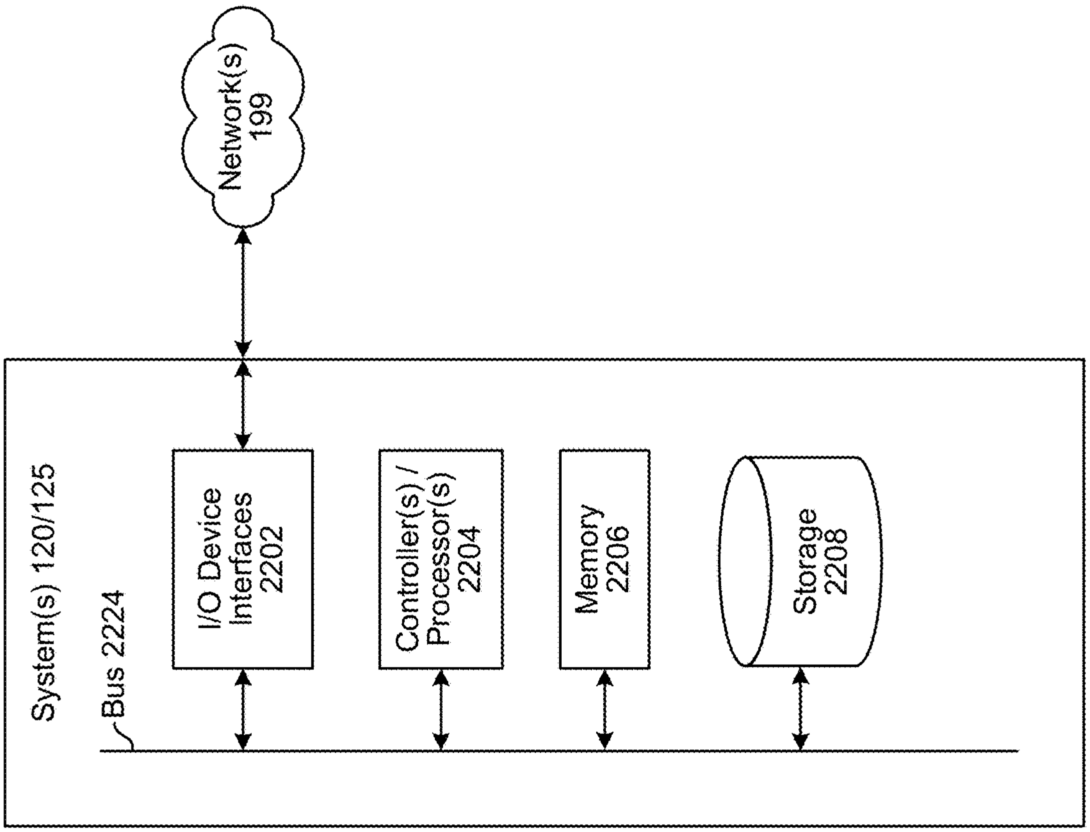
FIG. 22 is a block diagram conceptually illustrating example components of a system, according to embodiments of the present disclosure.

FIG. 21 is a block diagram conceptually illustrating a device 110 that may be used with the remote system 120. FIG. 22 is a block diagram conceptually illustrating example components of a remote device, such as the remote system 120, which may assist with ASR processing, NLU processing, etc.; and a skill component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more remote systems 120 for performing ASR processing, one or more remote systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (2104/2204), which may each include a central processing unit (CPU) for processing data and computer-readable instructions, and a memory (2106/2206) for storing data and instructions of the respective device. The memories (2106/2206) may individually include volatile random access memory (RAM), non-volatile read only memory (ROM), non-volatile magnetoresistive memory (MRAM), and/or other types of memory. Each device (110/120/125) may also include a data storage component (2108/2208) for storing data and controller/processor-executable instructions. Each data storage component (2108/2208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (2102/2202).

Computer instructions for operating each device (110/120/125) and its various components may be executed by the respective device's controller(s)/processor(s) (2104/2204), using the memory (2106/2206) as temporary "working" storage at runtime. A device's computer instructions may be stored in a non-transitory manner in non-volatile memory (2106/2206), storage (2108/2208), or an external device(s). Alternatively, some or all of the executable instructions may be embedded in hardware or firmware on the respective device in addition to or instead of software.

Each device (110/120/125) includes input/output device interfaces (2102/2202). A variety of components may be connected through the input/output device interfaces (2102/2202), as will be discussed further below. Additionally, each device (110/120/125) may include an address/data bus (2124/2224) for conveying data among components of the respective device. Each component within a device (110/120/125) may also be directly connected to other components in addition to (or instead of) being connected to other components across the bus (2124/2224).

Referring to FIG. 21, the device 110 may include input/output device interfaces 2102 that connect to a variety of components such as an audio output component such as a speaker 2112, a wired headset or a wireless headset (not illustrated), or other component capable of outputting audio. The device 110 may also include an audio capture component. The audio capture component may be, for example, a microphone 2120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 2116 for displaying content. The device 110 may further include a camera 2118.

Via antenna(s) 2114, the input/output device interfaces 2102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2102/2202) may also include communication components that allow data to be exchanged between devices such as different physical servers in a collection of servers or other components.

The components of the device 110, the remote system 120, and/or a skill component 125 may include their own dedicated processors, memory, and/or storage. Alternatively, one or more of the components of the device 110, the remote system 120, and/or a skill component 125 may utilize the I/O interfaces (2102/2202), processor(s) (2104/2204), memory (2106/2206), and/or storage (2108/2208) of the device(s) 110, system 120, or the skill component 125, respectively. Thus, the ASR component may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and a skill component 125, as described herein, are illustrative, and may be located as a stand-alone device or may be included, in whole or in part, as a component of a larger device or system.

Figure 23:
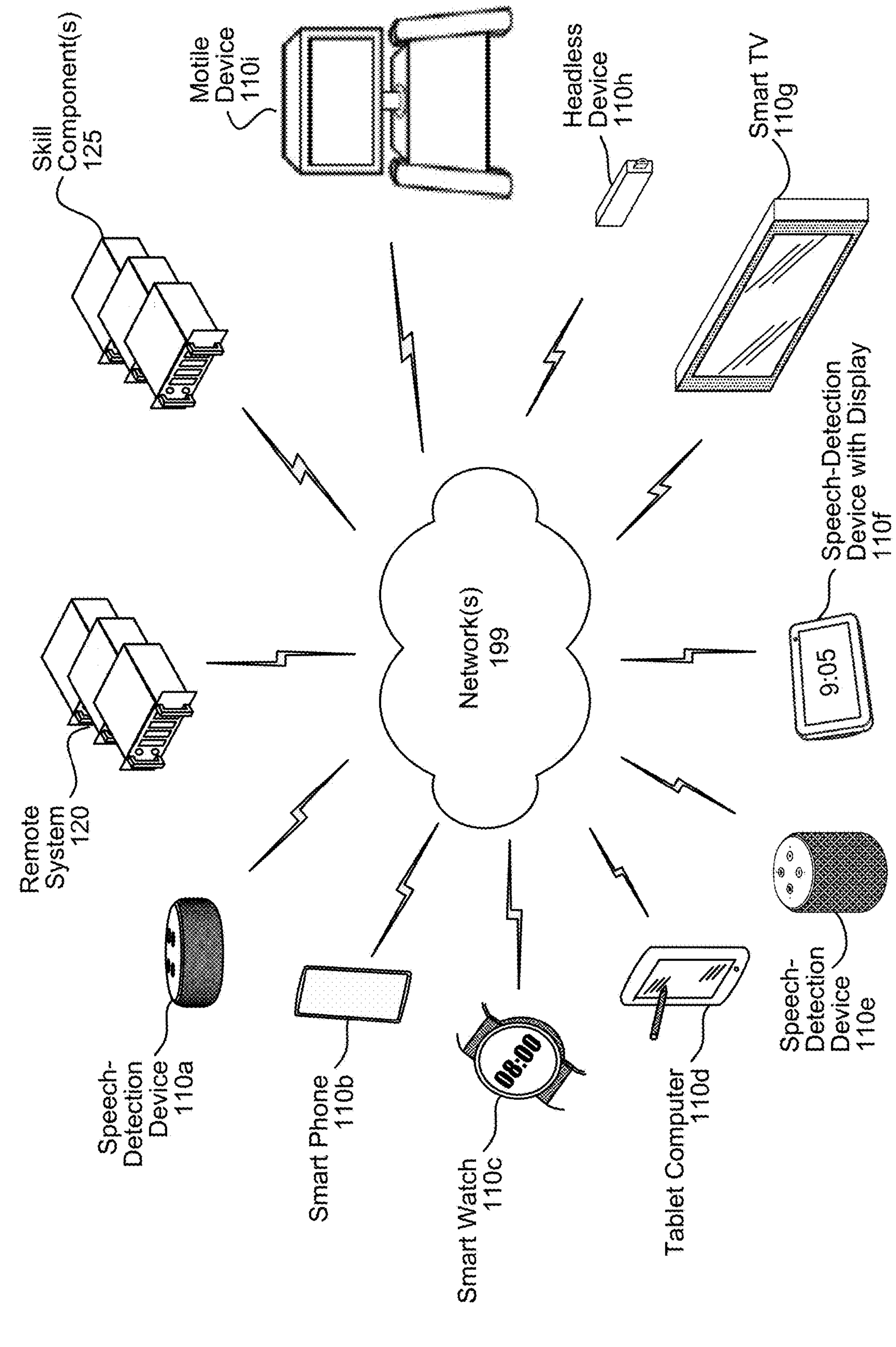
FIG. 23 illustrates an example of a computer network for use with the overall system, according to embodiments of the present disclosure.

As illustrated in FIG. 23, multiple devices (110*a*-110*k*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch

110*c*, a tablet computer 110*d*, a speech-detection device 110*e*, a display device 110*f*, a smart television 110*g*, a headless device 110*h*, and/or a motile device 110*i* may be connected to the network(s) 199 through a wireless service provider, over a Wi-Fi or cellular network connection, or the like. Other devices are included as network-connected support devices, such as the remote system 120, the skill component(s) 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

receiving, by a first device from a second device, first audio data including a first representation of a first audible sound associated with a sound source;

receiving, by the first device from a third device, second audio data including a second representation of the first audible sound;

receiving, by the first device from the second device, first angle data indicating a first direction associated with the sound source relative to the second device;

receiving, by the first device from the third device, second angle data indicating a second direction associated with the sound source relative to the third device;

determining, using the first audio data, the second audio data, and a first plurality of segments representing an environment of the first device, a first plurality of values representing respective likelihoods of a location of the sound source;

determining, using the first plurality of segments, the first angle data, and the second angle data, a second plurality of values representing respective likelihoods of the location of the sound source; and determining, using the first plurality of values and the second plurality of values, first location data corresponding to the location of the sound source in the environment.

2. The computer-implemented method of claim 1, wherein determining the first location data further comprises:

determining, using the first plurality of values and the second plurality of values, a third plurality of values;

determining that a first segment of the first plurality of segments is associated with a highest value of the third plurality of values; and determining, using the first segment, the first location data.

3. The computer-implemented method of claim 1, further comprising:

generating, by the second device, the first angle data by determining a first angle of arrival value of the first audible sound relative to the second device;

generating, by the third device, the second angle data by determining a second angle of arrival value of the first audible sound relative to the third device; and determining, by the first device, first cross correlation data using the first audio data and the second audio data, the first cross correlation data indicating a time difference of arrival value associated with the second device and the third device.

4. The computer-implemented method of claim 1, wherein determining the second plurality of values further comprises:

determining, using the first angle data, a first angle value corresponding to the first direction;

determining a second angle value indicating a third direction of a second location relative to the second device, the second location corresponding to a first segment of the first plurality of segments;

determining a difference value between the first angle value and the second angle value; and determining, using the difference value, a first value of the second plurality of values, the first value indicating a first likelihood that the first segment corresponds to the sound source.

5. The computer-implemented method of claim 1, wherein determining the first plurality of values further comprises:

determining first cross correlation data using the first audio data and the second audio data;

determining a first portion of the first cross correlation data that corresponds to a first segment of the first plurality of segments; and determining, using the first portion of the first cross correlation data, a first value of the first plurality of values, the first value indicating a first likelihood that the first segment corresponds to the sound source.

6. The computer-implemented method of claim 1, further comprising:

generating, by the second device, the first audio data using a first microphone of the second device;

generating, by the second device, third audio data using a second microphone of the second device, the third audio data including a third representation of the first audible sound;

determining, using the first audio data and the third audio data, a first time-difference value between a first time associated with the first microphone detecting the first audible sound and a second time associated with the second microphone detecting the first audible sound;

determining, using the first time-difference value, the first direction; and determining first cross correlation data using the first audio data and the second audio data, the first cross correlation data indicating a second time-difference value between the first time and a third time associated with the third device detecting the first audible sound.

7. The computer-implemented method of claim 1, further comprising:

selecting, using the first plurality of values and the second plurality of values, a portion of the environment;

determining, using the first audio data, the second audio data, and a second plurality of segments representing the portion of the environment, a third plurality of values representing respective likelihoods of the location of the sound source, the second plurality of segments having a first size that is smaller than a second size of the first plurality of segments; and determining, using the second plurality of segments, the first angle data, and the second angle data, a fourth plurality of values representing respective likelihoods of the location of the sound source, wherein the first location data is determined using the third plurality of values and the fourth plurality of values.

8. The computer-implemented method of claim 1, further comprising:

determining, using the first plurality of values and the second plurality of values, a third plurality of values;

determining a highest value included in the third plurality of values;

determining an average value of the third plurality of values;

determining a ratio value between the highest value and the average value;

determining that the ratio value is below a threshold value; and determining that the first location data does not indicate the location of the sound source.

9. The computer-implemented method of claim 1, further comprising:

receiving, by the first device from the second device, third audio data including a first representation of a second audible sound generated by the second device and a first representation of a third audible sound generated by the third device;

receiving, by the first device from the third device, fourth audio data including a second representation of the second audible sound and a second representation of the third audible sound;

determining, using the third audio data, a first time value corresponding to a first midpoint between a second time value associated with the first representation of the second audible sound and a third time value associated with the first representation of the third audible sound;

determining, using the fourth audio data, a fourth time value corresponding to a second midpoint between a fifth time value associated with the second representation of the second audible sound and a sixth time value associated with the second representation of the third audible sound;

determining a difference value between the second time value and the first time value; and aligning the first audio data and the second audio data using the difference value.

10. The computer-implemented method of claim 1, wherein determining the second plurality of values further comprises:

determining a first weight value corresponding to a first variance associated with the first angle data;

determining a second weight value corresponding to a second variance associated with the second angle data;

determining, using the first angle data, a third value indicating a first likelihood that a first segment of the first plurality of segments corresponds to the sound source;

determining, using the second angle data, a fourth value indicating a second likelihood that the first segment corresponds to the sound source; and determining the second plurality of values based on a first product of the first weight value and the third value and a second product of the second weight value and the fourth value.

11. A system comprising:

at least one processor; and memory including instructions operable to be executed by the at least one processor to cause the system to:

receive, by a first device from a second device, first audio data including a first representation of a first audible sound associated with a sound source;

receive, by the first device from a third device, second audio data including a second representation of the first audible sound;

receive, by the first device from the second device, first angle data indicating a first direction associated with the sound source relative to the second device;

receive, by the first device from the third device, second angle data indicating a second direction associated with the sound source relative to the third device;

determine, using the first audio data, the second audio data, and a first plurality of segments representing an environment of the first device, a first plurality of values representing respective likelihoods of a location of the sound source;

determine, using the first plurality of segments, the first angle data, and the second angle data, a second plurality of values representing respective likelihoods of the location of the sound source; and determine, using the first plurality of values and the second plurality of values, first location data corresponding to the location of the sound source in the environment.

12. The system of claim 11, wherein the memory further comprises instructions that, when executed by the at least one processor, further cause the system to:

determine, using the first plurality of values and the second plurality of values, a third plurality of values;

determine that a first segment of the first plurality of segments is associated with a highest value of the third plurality of values; and determine, using the first segment, the first location data.

13. The system of claim 11, wherein the memory further comprises instructions that, when executed by the at least one processor, further cause the system to:

generate, by the second device, the first angle data by determining a first angle of arrival value of the first audible sound relative to the second device;

generate, by the third device, the second angle data by determining a second angle of arrival value of the first audible sound relative to the third device; and determine, by the first device, first cross correlation data using the first audio data and the second audio data, the first cross correlation data indicating a time difference of arrival value associated with the second device and the third device.

14. The system of claim 11, wherein the memory further comprises instructions that, when executed by the at least one processor, further cause the system to:

determine, using the first angle data, a first angle value corresponding to the first direction;

determine a second angle value indicating a third direction of a second location relative to the second device, the second location corresponding to a first segment of the first plurality of segments;

determine a difference value between the first angle value and the second angle value; and determine, using the difference value, a first value of the second plurality of values, the first value indicating a first likelihood that the first segment corresponds to the sound source.

15. The system of claim 11, wherein the memory further comprises instructions that, when executed by the at least one processor, further cause the system to:

generate, by the second device, the first audio data using a first microphone of the second device;

generate, by the second device, third audio data using a second microphone of the second device, the third audio data including a third representation of the first audible sound;

determine, using the first audio data and the third audio data, a first time-difference value between a first time associated with the first microphone detecting the first audible sound and a second time associated with the second microphone detecting the first audible sound;

determine, using the first time-difference value, the first direction; and determine first cross correlation data using the first audio data and the second audio data, the first cross correlation data indicating a second time-difference value between the first time and a third time associated with the third device detecting the first audible sound.

16. The system of claim 11, wherein the memory further comprises instructions that, when executed by the at least one processor, further cause the system to:

select, using the first plurality of values and the second plurality of values, a portion of the environment;

determine, using the first audio data, the second audio data, and a second plurality of segments representing the portion of the environment, a third plurality of values representing respective likelihoods of the location of the sound source, the second plurality of segments having a first size that is smaller than a second size of the first plurality of segments; and determine, using the second plurality of segments, the first angle data, and the second angle data, a fourth plurality of values representing respective likelihoods of the location of the sound source, wherein the first location data is determined using the third plurality of values and the fourth plurality of values.

17. A computer-implemented method, the method comprising:

generating, by a first device using a microphone array that includes a first microphone and a second microphone, first audio data including a first representation of a first audible sound associated with a sound source;

determining, by the first device using the microphone array, a first time-difference value between when the first microphone detected the first audible sound and when the second microphone detected the first audible sound;

determining, using the first time difference value, first angle data indicating a first direction associated with the sound source relative to the first device;

receiving, by the first device from a second device, second audio data including a second representation of the first audible sound;

receiving, by the first device from the second device, second angle data indicating a second direction associated with the sound source relative to the second device;

determining, using the first audio data and the second audio data, first cross correlation data indicating a second time-difference value between when the first device detected the first audible sound and when the second device detected the first audible sound;

determining, using the first angle data and the second angle data, a first value indicating a first likelihood that a first segment of a plurality of segments corresponds to a location of the sound source, the plurality of segments representing an environment of the first device;

determining, using the first cross correlation data, a second value indicating a second likelihood that the first segment corresponds to the location of the sound source; and determining, using the first value and the second value, first location data corresponding to the location of the sound source in the environment.

18. The computer-implemented method of claim 17, wherein determining the first location data further comprises:

determining, using the first value and the second value, a third value indicating a third likelihood that the first segment corresponds to the location of the sound source;

determining that the third value is a highest value of a plurality of values, the plurality of values representing respective likelihoods of the location of the sound source for the plurality of segments; and determining the first location data associated with the first segment.

19. The computer-implemented method of claim 17, further comprising:

generating, by the first device, third audio data including a first representation of a second audible sound associated with a third device;

receiving, by the first device from the second device, fourth audio data including a second representation of the second audible sound;

determining, using the third audio data and the fourth audio data, second cross correlation data indicating a third time-difference value between when the first device detected the second audible sound and when the second device detected the second audible sound;

determining, using the second cross correlation data, a third value indicating a third likelihood that the first segment corresponds to a second location of the third device; and determining, using the third value, orientation data indicating a third direction of the third device relative to the location of the sound source.

20. The computer-implemented method of claim 17, wherein determining the first value further comprises:

determining, using the first angle data, a first angle value corresponding to the first direction;

determining a second angle value indicating a third direction of a second location relative to the second device, the second location corresponding to the first segment;

determining a difference value between the first angle value and the second angle value; and determining, using the difference value, the first value.

* * * * *